(12) United States Patent
Umehara et al.

(10) Patent No.: US 12,191,736 B2
(45) Date of Patent: Jan. 7, 2025

(54) ELECTRONIC DEVICE

(71) Applicant: Minebea Mitsumi Inc., Nagano (JP)

(72) Inventors: Mikio Umehara, Yonago (JP); Yutaka Kamogi, Yonago (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/489,238

(22) Filed: Oct. 18, 2023

(65) Prior Publication Data

US 2024/0072626 A1    Feb. 29, 2024

Related U.S. Application Data

(60) Continuation of application No. 18/057,428, filed on Nov. 21, 2022, now Pat. No. 11,831,213, which is a continuation of application No. 17/237,782, filed on Apr. 22, 2021, now Pat. No. 11,539,278, which is a division of application No. 16/906,260, filed on Jun. 19, 2020, now Pat. No. 11,031,854, which is a division of application No. 15/822,465, filed on Nov. 27, 2017, now Pat. No. 10,727,726.

(30) Foreign Application Priority Data

Nov. 28, 2016  (JP) ................. 2016-230689

(51) Int. Cl.
*H02K 33/02* (2006.01)
*G06F 3/01* (2006.01)
*H02K 5/22* (2006.01)

(52) U.S. Cl.
CPC ............. *H02K 33/02* (2013.01); *H02K 5/225* (2013.01); *G06F 3/016* (2013.01)

(58) Field of Classification Search
CPC ........ H02K 33/02; H02K 5/225; G06F 3/016; H04M 1/026
USPC ............................................................ 310/15
See application file for complete search history.

(56) References Cited

U.S. PATENT DOCUMENTS 2,759,113 A   8/1956  Bonanno
2,926,615 A   3/1960  Coffey
(Continued)

FOREIGN PATENT DOCUMENTS

CN    1291118 A    4/2001
CN    1697709 A    11/2005
(Continued)

OTHER PUBLICATIONS

Notice of Reasons for Refusal dated Sep. 3, 2019 for corresponding Japanese Application No. 2016-230689 and English translation.
(Continued)

*Primary Examiner* — Ahmed Elnakib
(74) *Attorney, Agent, or Firm* — Chrisman Gallo Tochtrop LLC

(57) ABSTRACT

In accordance with one aspect of the present disclosure, an electronic device includes a housing, a contact member attached to the housing, a plate displaceable with respect to the base, an elastic member supporting the plate with respect to the base. The base, the plate and the elastic member are arranged inside the housing. A magnetic gap is formed with the plate and the base. The plate connects with the contact member.

16 Claims, 31 Drawing Sheets

(56) References Cited

U.S. PATENT DOCUMENTS

| | | | |
|---|---|---|---|
| 3,067,404 A | 12/1962 | Hildebrandt | |
| 3,312,841 A | 4/1967 | Makino | |
| 3,345,525 A | 10/1967 | MacBlane | |
| 3,404,299 A * | 10/1968 | MacBlane | H02K 33/04 310/17 |
| 3,733,500 A | 5/1973 | Mushrush | |
| 6,924,965 B2 | 8/2005 | Babich | |
| 10,715,020 B2 | 7/2020 | Umehara et al. | |
| 10,727,726 B2 | 7/2020 | Umehara et al. | |
| 11,043,887 B2 | 6/2021 | Umehara et al. | |
| 11,476,743 B2 | 10/2022 | Umehara et al. | |
| 11,539,278 B2 | 12/2022 | Umehara et al. | |
| 2002/0008602 A1 | 1/2002 | Kyouno et al. | |
| 2002/0149561 A1 | 10/2002 | Fukumoto et al. | |
| 2003/0036364 A1 | 2/2003 | Chung | |
| 2006/0082231 A1 | 4/2006 | Kayama et al. | |
| 2006/0097996 A1* | 5/2006 | Tabata | G06F 3/016 345/173 |
| 2007/0102270 A1 | 5/2007 | Kouichiro et al. | |
| 2008/0119768 A1 | 5/2008 | Kobayashi et al. | |
| 2010/0165794 A1 | 7/2010 | Takahashi et al. | |
| 2011/0051987 A1 | 3/2011 | Ueda et al. | |
| 2013/0106205 A1 | 5/2013 | Clamme | |
| 2013/0182878 A1 | 7/2013 | Liu | |
| 2013/0193779 A1 | 8/2013 | Kuroda | |
| 2013/0201127 A1 | 8/2013 | Abe et al. | |
| 2015/0084484 A1 | 5/2015 | Tada et al. | |
| 2015/0123500 A1 | 5/2015 | Jung | |
| 2015/0148108 A1 | 5/2015 | Odajima et al. | |
| 2015/0169061 A1 | 6/2015 | Odajima et al. | |
| 2015/0338883 A1 | 11/2015 | Farahani et al. | |
| 2017/0216885 A1 | 8/2017 | Takeda et al. | |
| 2018/0095536 A1 | 4/2018 | Wakuda et al. | |
| 2018/0152089 A1 | 5/2018 | Umehara et al. | |
| 2018/0152090 A1 | 5/2018 | Umehara et al. | |
| 2019/0310708 A1 | 10/2019 | Bodenstein | |

FOREIGN PATENT DOCUMENTS

| | | |
|---|---|---|
| CN | 101058092 A | 10/2007 |
| CN | 101239352 A | 8/2008 |
| CN | 101601309 A | 12/2009 |
| CN | 104467523 A | 3/2015 |
| CN | 105553217 A | 5/2016 |
| EP | 1 063 020 A1 | 12/2000 |
| EP | 3 176 930 A | 6/2017 |
| EP | 1 550 514 B1 | 11/2018 |
| JP | 05-176498 A | 7/1993 |
| JP | 11-000472 A | 1/1999 |
| JP | 2002-051516 A | 2/2002 |
| JP | 2002-192073 A | 7/2002 |
| JP | 2002-336786 A | 11/2002 |
| JP | 2003-053265 A | 2/2003 |
| JP | 2005-063150 A | 3/2005 |
| JP | 2006-139371 A | 6/2006 |
| JP | 2007-229680 A | 9/2007 |
| JP | 2012-043362 A | 3/2012 |
| JP | 2013-154290 A | 8/2013 |
| JP | 2014-530104 A | 11/2014 |
| JP | 2015-070729 A | 4/2015 |
| JP | 2015-070731 A | 4/2015 |
| JP | 2015-083306 A | 4/2015 |
| JP | 2015-202465 A | 11/2015 |
| JP | 2016-032417 A | 3/2016 |
| JP | 2016-095718 A | 5/2016 |
| KR | 10-1250288 B1 | 4/2013 |
| WO | 2006/064750 A1 | 6/2006 |
| WO | 2008/146678 A1 | 12/2008 |
| WO | 2012/161061 A1 | 11/2012 |

OTHER PUBLICATIONS

Chinese Office Action dated Dec. 27, 2019 for corresponding Chinese Application No. 201711204000.3 and English translation.
Chinese Office Action dated Oct. 10, 2020 for corresponding Chinese Application No. 201711204000.3 and English translation.
Japanese Office Action dated Nov. 10, 2020 for corresponding Japanese Application No. 2020-017625 and English translation.
Notification of Reasons for Refusal dated Oct. 20, 2020 for corresponding Japanese Application No. 2016-230690 and English translation.
Notification of Reasons for Refusal dated Dec. 1, 2020 for corresponding Japanese Application No. 2020-025260 and English translation.
Japanese Office Action dated Oct. 1, 2019 for corresponding Japanese Application No. 2016-230688 and English translation.
Decision of Refusal dated Apr. 13, 2021 in related Japanese Application No. 2020-025260 and English translation.
Notification of Reasons for Refusal dated Sep. 28, 2021 for related Japanese Application No. 2020-017625 and English translation (JP2020-017625 is a division of JP2016-230689, to which the present application claims priority).
Japanese Notice of Allowance for Japanese Application No. 2021-113945 dated Aug. 30, 2022 and English translation.
Office Action dated Dec. 26, 2023 for related Japanese Application No. 2022-156372 and English translation.
Office Action dated Jul. 19, 2023 for related Chinese Application No. 202110654934.7 and English translation.
Office Action dated Aug. 29, 2023 for related Japanese Application No. 2022-156372 and English translation.
Office Action dated Jun. 21, 2024 for related U.S. Appl. No. 18/525,955.
Wei et al., "Finite and transversely isotropic elastic cylinders under compression with end constraint induced by friction", International Journal of Solids and Structures, vol. 46, Issue 9, May 1, 2009, pp. 1953-1965.
Notice of Rejection dated May 14, 2024 in related JP Application No. 2022-156372 and English translation.
Office Action dated May 21, 2024 in related JP Application No. 2023-144785 and English translation.

* cited by examiner

ELECTRONIC DEVICE

CROSS REFERENCE TO RELATED APPLICATIONS

This application claims the benefit of U.S. patent application Ser. No. 18/057,428 filed on Nov. 21, 2022; Ser. No. 17/237,782 filed on Apr. 22, 2021; Ser. No. 16/906,260 filed on Jun. 19, 2020, now U.S. Pat. No. 11,031,854; Ser. No. 15/822,465, filed on Nov. 27, 2017, now U.S. Pat. No. 10,727,726; and Japanese Patent Application No. 2016-230689 filed Nov. 28, 2016, each of which is hereby incorporated by reference in its entirety.

BACKGROUND

Technical Field

The present disclosure relates to an electronic device, and more particularly, to an electronic device including a vibration generating device.

Background

Some electronic devices and the like incorporate a vibration generating device for generating a vibration.

Japanese Patent Laid-Open No. 2015-70729 discloses a structure in which a vibration actuator is attached to a touch panel of an information terminal processor through a vibration transmitting part for reducing the frequency of a vibration and transmitting the vibration to the touch panel.

Incidentally, in such electronic devices and the like, it is necessary to attach a vibration generating device to an electronic device so that a vibration force generated by the vibration generating device can be transmitted to a member of the electronic device.

The present disclosure is related to providing an electronic device capable of using a vibration of a vibration generating device.

SUMMARY

In accordance with one aspect of the present disclosure, an electronic device includes a housing, a contact member attached to the housing, and a vibration generating device. The vibration generating device is fixed to the contact member or the housing. A gap is formed between a surface of the vibration generating device facing the housing and a surface of the housing facing the vibration generating device.

Preferably, the vibration generating device is coupled or fixed to the contact member directly or through other member; the vibration generating device includes a base and a plate displaceable in a direction away from or closer to the base; and the plate can be into contact with or spaced apart from the contact member in the direction away from or closer to the base.

Preferably, the vibration generating device includes a first elastic member supporting the plate with respect to the base, and the first elastic member supporting the plate in contact with the contact member is deformed.

Preferably, the vibration generating device includes a first elastic member supporting the plate with respect to the base, and the first elastic member supporting the plate in contact with the contact member urges the plate toward the contact member in the direction away from or closer to the base.

Preferably, a second elastic member is provided between the plate and the contact member.

Preferably, the contact member is coupled to the housing through a third elastic member.

Preferably, a weight is provided at the plate.

Preferably, the vibration generating device is coupled to an outer peripheral part of the contact member.

In accordance with the above-mentioned aspects of the present disclosure, it is possible to provide an electronic device capable of using a vibration of a vibration generating device.

DETAILED DESCRIPTION

An electronic device including a vibration generating device according to an embodiment of the present disclosure will be described below.

Coordinates illustrated in the accompanying drawings are used to illustrate the posture of the vibration generating device. An X-axis direction of coordinates is also referred to as a left and right direction (a positive direction from an origin on an X-axis is a right direction). A Y-axis direction is also referred to as a front and back direction (a positive direction from an origin on a Y-axis is a back direction). A Z-axis direction (a direction vertical to an XY plane) is also referred to as an up and down direction (a positive direction from an origin on a Z-axis is an upward direction). A direction vertical to the Z-axis is also referred to as horizontal. Note that the terms "left and right", "front and back", "up and down", "horizontal", and the like are used to explain a structure or operation, and thus are not related to the posture or intended use of the vibration generating device and the electronic device in a state the vibration generating device and the electronic device used.

First Embodiment

Figure 1:
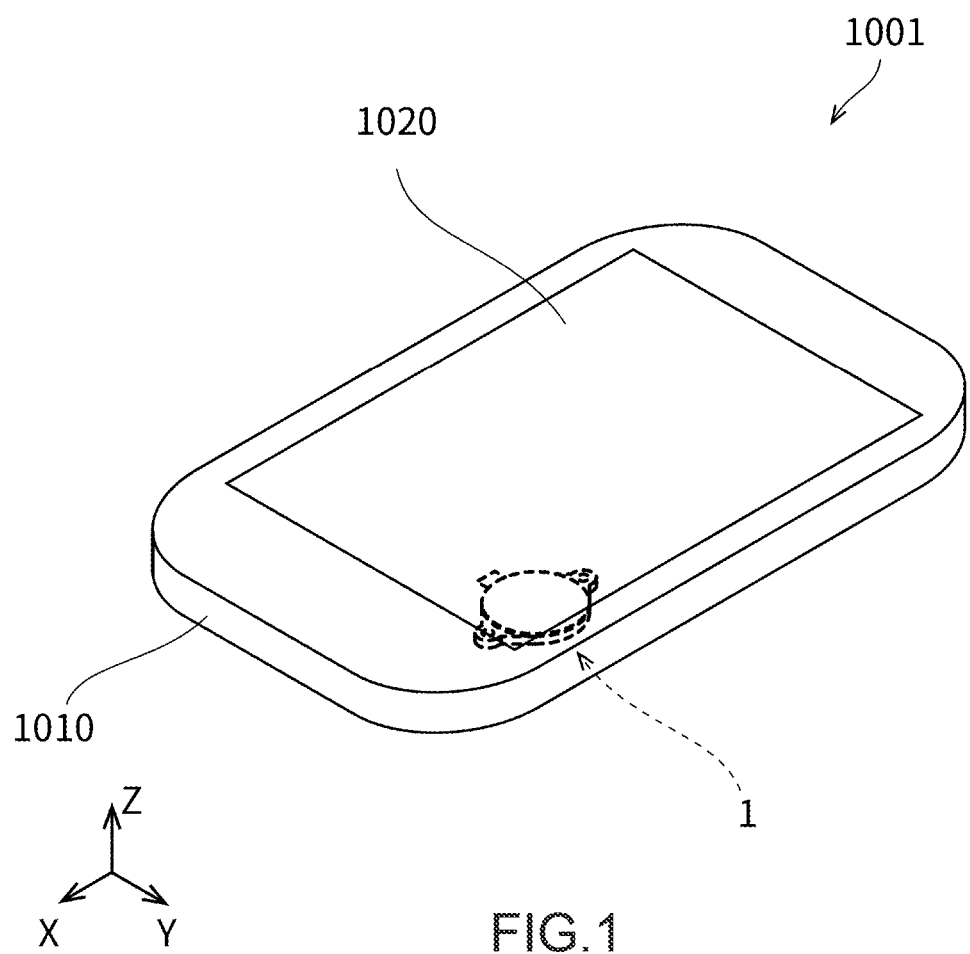
FIG. 1 is a perspective view illustrating an electronic device according to a first embodiment of the present disclosure.

FIG. 1 is a perspective view illustrating an electronic device according to a first embodiment of the present disclosure.

As illustrated in FIG. 1, an electronic device 1001 includes a housing 1010, a contact member 1020, and a vibration generating device 1. The electronic device 1001 is, for example, a so-called smartphone.

The contact member 1020 is, for example, a touch panel. The contact member 1020 is attached to the housing 1010.

The vibration generating device 1 generates a vibration force to be transmitted to the electronic device 1001. In the present embodiment, the vibration generating device 1 is coupled or fixed to the contact member 1020 directly or through another member. Note that the structure of the vibration generating device 1 is not limited to a structure, in this structure the vibration generating device 1 is coupled or fixed to the contact member 1020 directly or through other member, but instead the vibration generating device 1 may be coupled or fixed to the housing 1010 directly or through another member.

[Structure of Vibration Generating Device 1]

Figure 2:
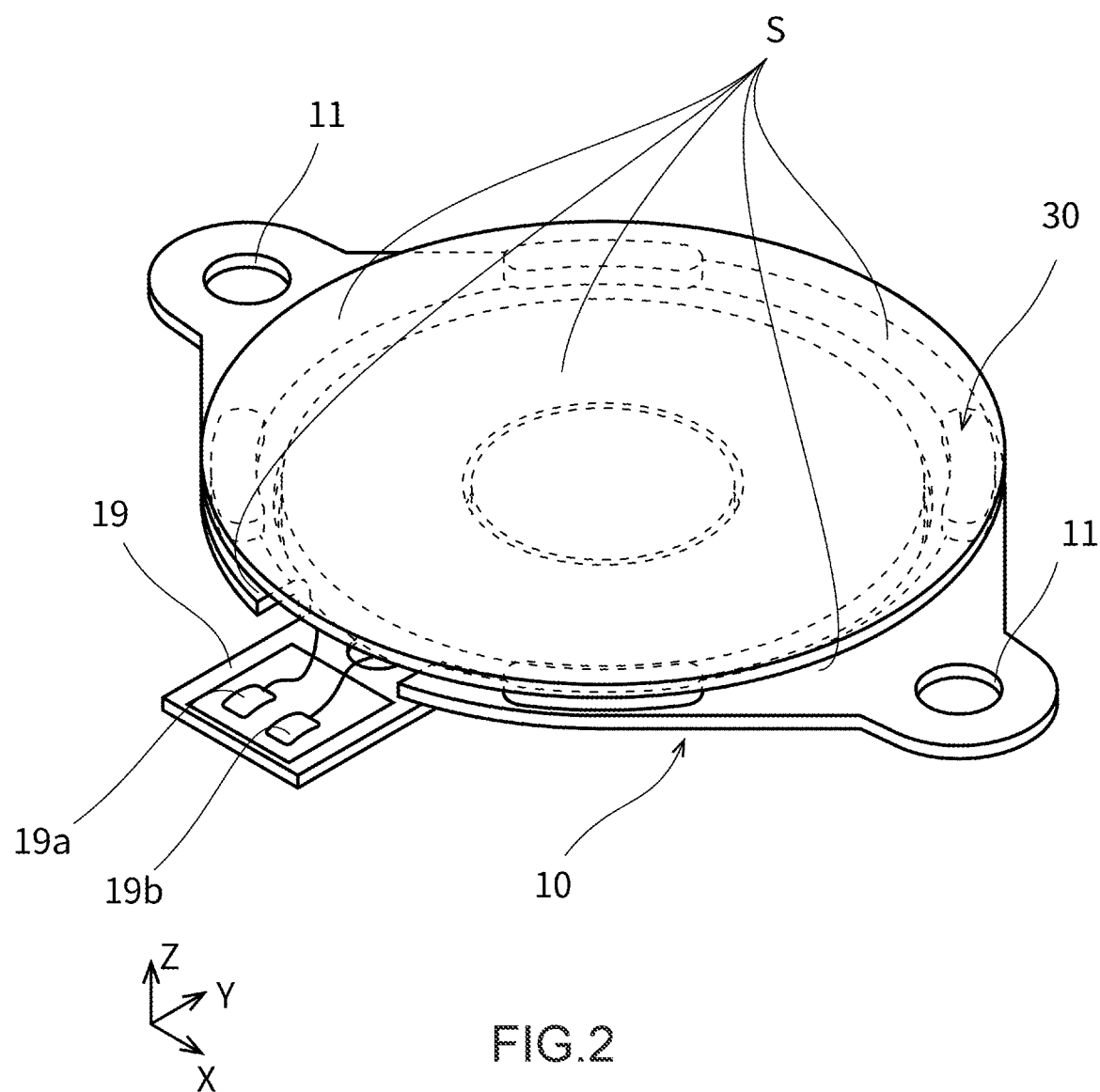
FIG. 2 is a perspective view illustrating a vibration generating device.
Figure 3:
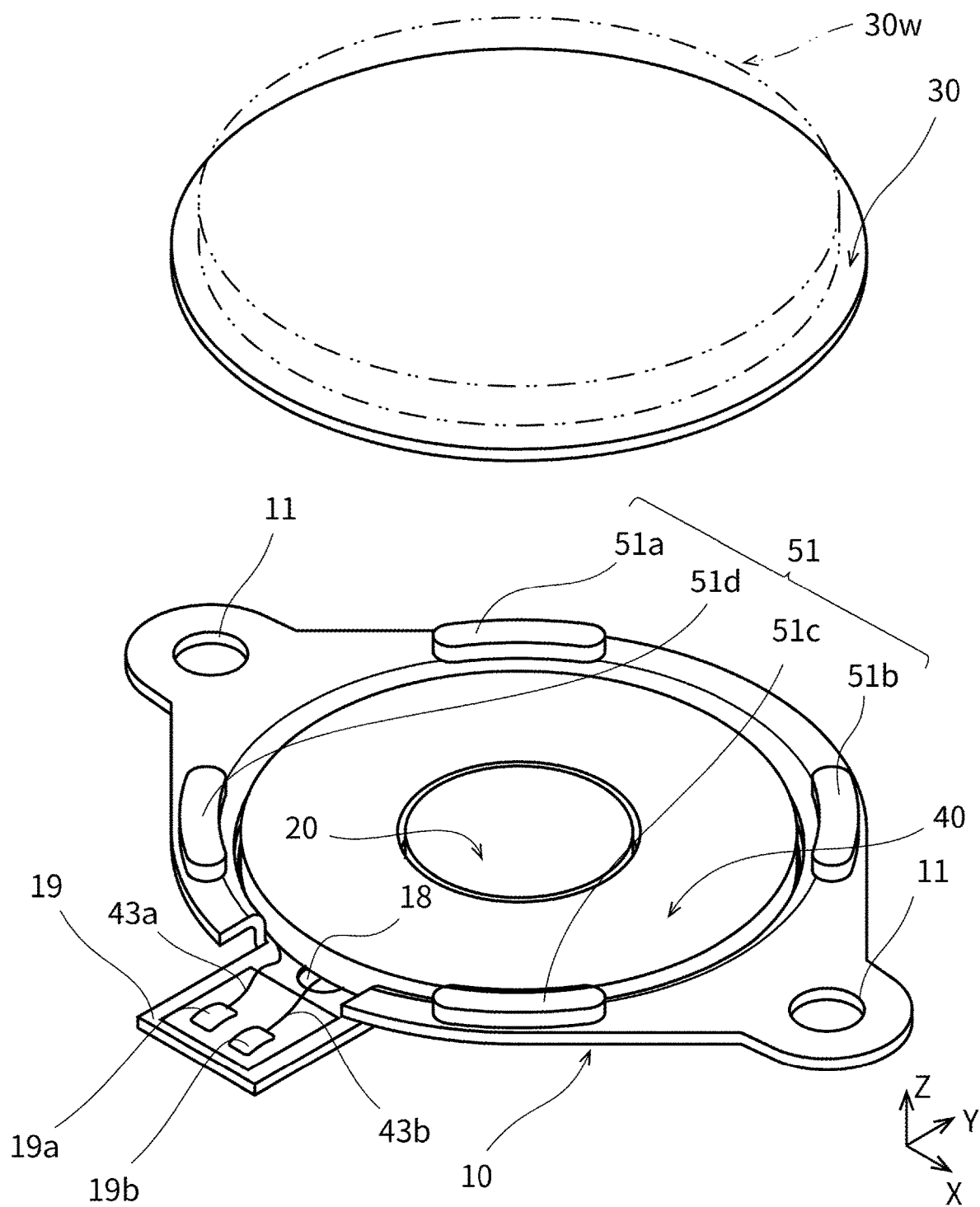
FIG. 3 is a perspective view illustrating an internal structure of the vibration generating device.
Figure 4:
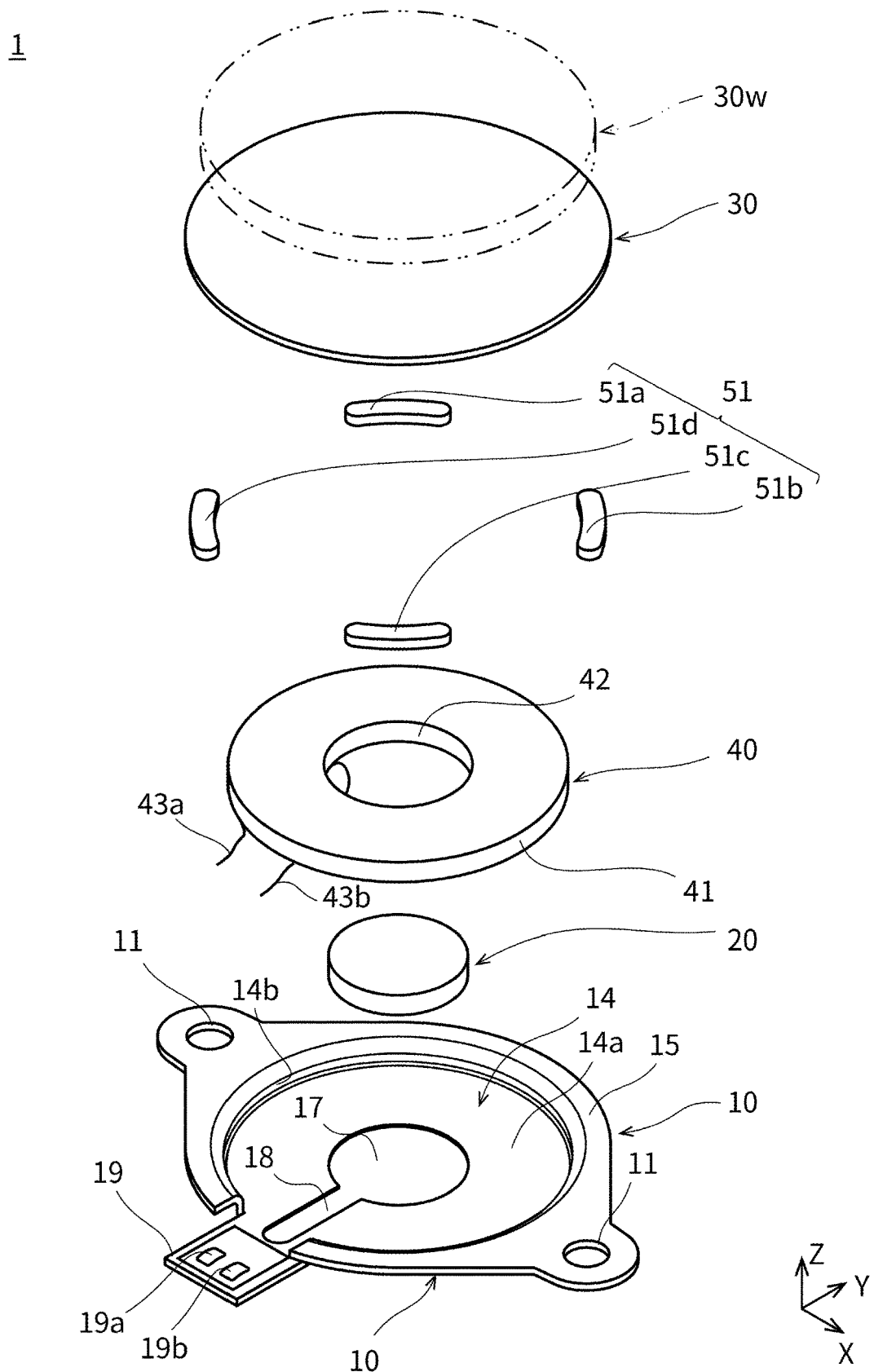
FIG. 4 is an exploded perspective view illustrating the vibration generating device.
Figure 5:
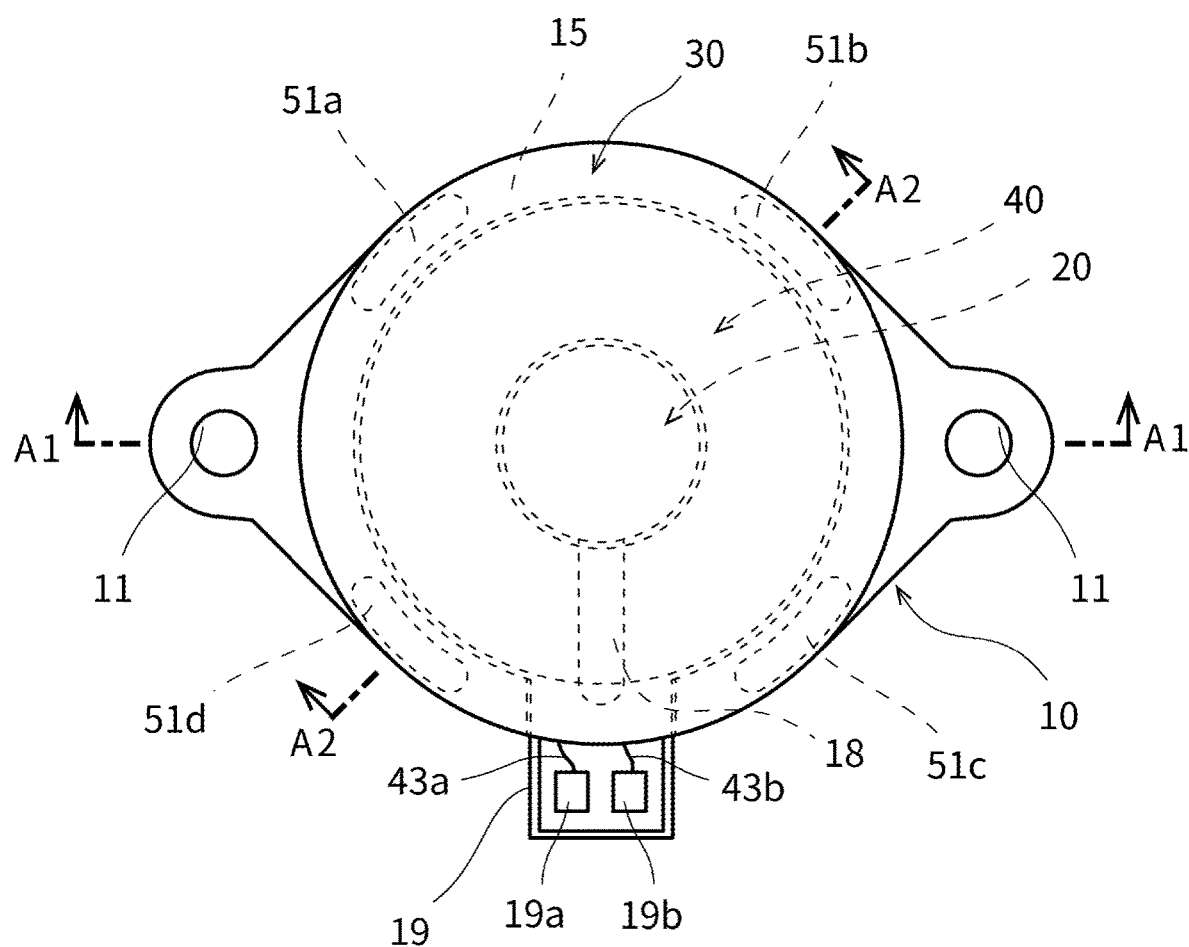
FIG. 5 is a plan view illustrating the vibration generating device.
Figure 6:
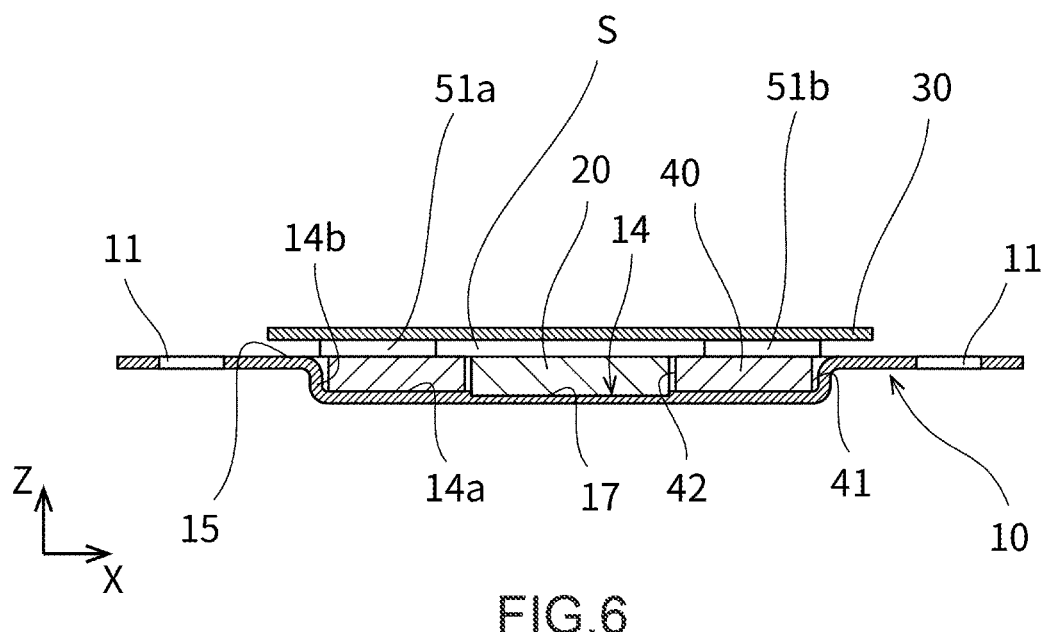
FIG. 6 is a sectional view taken along a line A1-A1 in FIG. 5.
Figure 7:
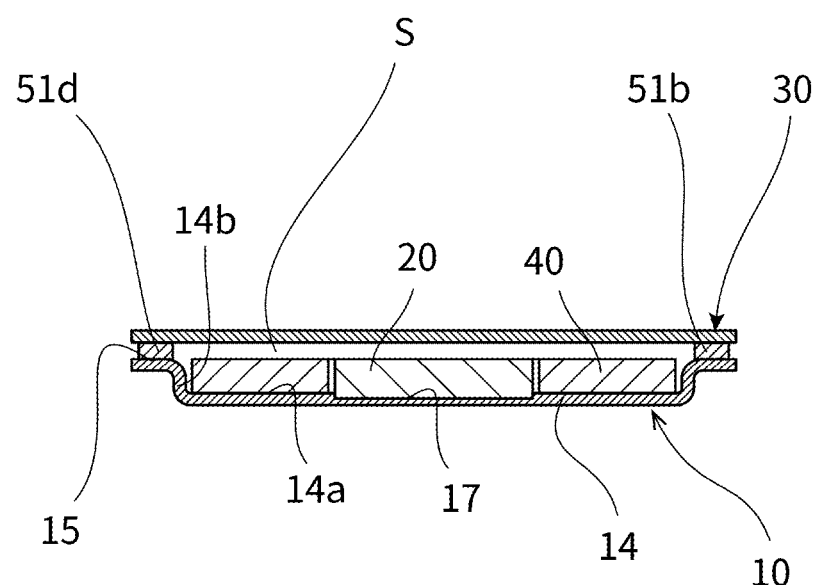
FIG. 7 is a sectional view taken along a line A2-A2 in FIG. 5.

FIG. 2 is a perspective view illustrating the vibration generating device 1. FIG. 3 is a perspective view illustrating an internal structure of the vibration generating device 1. FIG. 4 is an exploded perspective view illustrating the vibration generating device 1. FIG. 5 is a plan view illustrating the vibration generating device 1. FIG. 6 is a sectional view taken along a line A1-A1 in FIG. 5. FIG. 7 is a sectional view taken along a line A2-A2 in FIG. 5.

As illustrated in FIG. 2, the vibration generating device 1 is formed in a thin plate shape as a whole. The vibration generating device 1 has a flat shape. The vibration generating device 1 has such a small size that, for example, outline dimensions in each of the left and right direction and the front and back direction are about several tens of millimeters, and outer diameter dimensions in the up and down direction are about several millimeters. The vibration generating device 1 roughly has a disc shape having an outer diameter of, for example, about 20 millimeters, and a thickness of about three millimeters, except for a part providing hole parts 11.

As illustrated in FIG. 3, the vibration generating device 1 includes a base 10, a plate 30, a coil 40, and elastic members 51.

The base 10 is formed with a magnetic body. The base 10 is formed with, for example, metal. The base 10 is formed with, for example, iron. The base 10 is formed by, for example, molding a steel plate or the like by pressing or the like. Note that the base 10 may be formed by performing processing such as cutting.

As illustrated in FIG. 4, the base 10 includes a flange part 15 and a recessed part 14 recessed downward from the flange part 15. The recessed part 14 has, for example, a circular shape in a plan view. In other words, the base 10 includes a thin columnar part opened upward (a bottomed tubular part). The columnar part has, for example, a cylindrical shape. An upper end part of the columnar part corresponds to the flange part 15 having a flange shape opened in the outer peripheral direction. In the present embodiment, the flange part 15 extends more than the other part in the left and right direction, and the hole parts 11 is provided at the extending part of the flange part 15. As illustrated in FIG. 5, the hole parts 11 are arranged at the left and right sides of the recessed part 14 and used for, for example, attaching the vibration generating device 1 to the electronic device 1001 or the like.

As illustrated in FIG. 6, the recessed part 14 includes a bottom part 14a and a side wall part 14b. As illustrated in FIG. 4, a front part of the side wall part 14b is removed. In other words, a part of the side wall part 14b is cut out and recessed.

A terminal plate 19 extending forward from the bottom part 14a is provided at the cut-out part of the side wall part 14b. The terminal plate 19 is a projecting part that projects outward from the side wall part 14b. Terminals 19a and 19b for energizing the coil 40 is at the terminal plate 19. The terminals 19a and 19b are formed at, for example, a flexible substrate, and are joined to the terminal plate 19. Instead of providing the terminal plate 19, a part of the side wall part 14b and the bottom part 14a may be removed, and a path for energizing the coil 40 from below the base 10 or from a side of the base 10 may be provided passing through the removed part.

In the present embodiment, a dent 17 and a groove part 18 are provided at an upper surface of the bottom part 14a. A depth from the upper surface of the bottom part 14a to the dent 17 or the groove part 18 is shorter than the depth of the recessed part 14 in the up and down direction (a distance from the upper surface of the flange part 15 to the upper surface of the bottom part 14a). The dent 17 is formed substantially at a central part of the recessed part 14. The dent 17 is formed in a shape that fits the shape of a protruding part 20 described below. For example, the dent 17 has a circular shape in a plan view. The groove part 18 is formed in a range from the substantially central part of the recessed part 14 to the vicinity of the terminal plate 19. The groove part 18 extends from the dent 17 toward the terminal plate 19 in the front and back direction so that the front and back direction matches the longitudinal direction.

As illustrated in FIG. 6, the protruding part 20 is provided at the base 10. The protruding part 20 is arranged at a central part of the base 10. The protruding part 20 has, for example, a columnar shape. In the present embodiment, the protruding part 20 has a cylindrical shape. The position of the upper end part of the protruding part 20 in the up and down direction is substantially the same as the position of the upper surface of the flange part 15. Note that the upper end part of the protruding part 20 in the up and down direction may be located above or below the upper surface of the flange part 15.

In the present embodiment, the protruding part 20 is formed separately from the main body of the base 10 that is formed with a steel plate or the like, and is attached to the main body of the base 10. The protruding part 20 is attached to the main body of the base 10 in such a manner. In this manner the protruding part 20 is fitted into the dent 17. The protruding part 20 is attached to the dent 17 by, for example, joining or welding. The protruding part 20 is formed with a magnetic body, like the main body of the base 10. The protruding part 20 is formed with, for example, metal. The protruding part 20 is formed with, for example, iron. The protruding part 20 functions as an electromagnet core (iron core) using the coil 40.

As illustrated in FIG. 4, the coil 40 has an annular flat shape. The coil 40 is a thin coil. A dimension of the coil 40 in a winding axis direction is smaller than a dimension in a direction orthogonal to the winding axis direction. The coil 40 is, for example, a tabular coil being a wound conductive wire and having a circular ring shape as a whole. Note that the coil 40 may be formed by slicing a wound metal foil, or may be formed by stacking sheet coils. The outer shape of the coil 40 may be a polygonal shape, such as a circular shape or a square shape, in a plan view.

The coil 40 is annularly wound around the protruding part 20. In other words, the coil 40 is accommodated in the recessed part 14. Specifically, the coil 40 is arranged between the outer periphery of the protruding part 20 and the inner periphery of the side wall part 14b. The coil 40 is formed in such a manner. In this manner the upper surface of the coil 40 is not located above the upper surface of the flange part 15. The coil 40 is attached to the base 10. The coil 40 wound in a doughnut-like plate shape in advance may be attached to the base 10 in such a manner. In this manner the coil 40 is fitted into the recessed part 14. Alternatively, the coil 40 may be formed on the base 10 by directly winding a conductive wire around the base 10 so as to surround the protruding part 20.

A gap is formed between the inner surface of the side wall part 14b serving as an outer peripheral part of the base 10 and an outer peripheral side surface 41 of the coil 40. A gap is also formed between the outer peripheral side surface of the protruding part 20 and an inner surface 42 of the coil 40. Thus, an insulation state is ensured, in the insulation state the base 10 and the coil 40 are not in contact with each other.

The coil 40 is formed by winding, for example, a conductive wire having a diameter of 0.15 with about 100 to 200 turns (e.g., 150 turns). The specifications of the coil 40 are not limited to these specifications and can be appropriately selected depending on the size, intended use, and the like of the vibration generating device 1.

An end part (winding end part) 43a of the conductive wire at the outside of the coil 40 is pulled out to the outside of the base 10 from the inside of the recessed part 14 through the removed part of the removed side wall part 14b. An end part (winding end part) 43b of the conductive wire at the inside of the coil 40 is pulled out to the outside of the base 10 from the removed part of the removed side wall part 14b through the lower side of the coil 40.

In the present embodiment, the winding end part 43b is pulled out to the terminal plate 19 from the inside of the coil 40 through the groove part 18. This prevents a load from being applied to the conductive wire and impairing the insulation when the conductive wire leading to the winding end part 43b is sandwiched between the lower surface of the coil 40 and the upper surface of the bottom part 14a. In order to ensure the insulation between the coil 40 and the base 10, a tubular insulating member penetrating through the conductive wire of the coil 40 may be inserted.

The winding end parts 43a and 43b are pulled out to the outside of the base 10 through the removed part of the removed side wall part 14b. The winding end parts 43a and 43b are connected to the terminals 19a and 19b, respectively, by soldering or the like. A conductive wire leading from the outside is connected to the terminals 19a and 19b, thereby making the conductive wire possible to energize the coil 40 through the conductive wire. The terminals 19a and 19b are arranged on the terminal plate 19. This structure facilitates the connection between the conductive wire leading from the outside and the terminals 19a and 19b.

The plate 30 has a circular plate shape in parallel to a horizontal plane in the present embodiment. The plate 30 is formed with a magnetic body. The plate 30 is formed with, for example, metal. The plate 30 is formed with, for example, iron. The plate 30 is formed by, for example, molding a steel plate or the like by pressing or the like. Note that the plate 30 may be formed by performing processing such as cutting.

The plate 30 is arranged above the base 10 and facing the base 10. As illustrated in FIG. 5, the plate 30 has outer diameter dimensions substantially the same as the outer diameter dimensions of the circumferential part of the flange part 15, excluding the part providing the hole parts 11. The plate 30 is formed to cover the flange part 15, except for the part providing the hole parts 11. As illustrated in FIG. 7, a lower surface of a part in the vicinity of the outer peripheral part of the plate 30 faces the upper surface of the flange part 15. In other words, the flange part 15 is provided in a region of the base 10 at the outside of the outer peripheral part of the coil 40, and faces the surface of the plate 30.

As illustrated in FIG. 7, the plate 30 is arranged at a short interval from the base 10 forming a magnetic circuit. The elastic members 51 are arranged between the plate 30 and the base 10. Since the elastic members 51 are arranged, a constant interval is set between the plate 30 and the base 10 in a state such that the coil 40 is not energized. In other words, the plate 30 is located at a position higher than the flange part 15 of the base 10 by an amount equal to the thickness of each elastic member 51.

The elastic members 51 are, for example, resin members each having a restoring force, and are deformable. The elastic members 51 support the plate 30 with respect to the base 10. The elastic members 51 are provided between the plate 30 and the base 10. In the present embodiment, the elastic members 51 are arranged being sandwiched between the flange part 15 and the plate 30. Specifically, the elastic members 51 are arranged between the outer peripheral part of the base 10 located outside the coil 40 and the outer peripheral part of the plate 30 located outside the coil 40.

The elastic members 51 are joined and fixed to, for example, the flange part 15 with a joining material. Note that the method for arranging the elastic members 51 is not limited to joining. The elastic members 51 may be fixed to the plate 30, or may be fixed to each of the flange part 15 and the plate 30 by joining or the like. The elastic members 51 need not necessarily be fixed to each of the flange part 15 and the plate 30.

Four members (elastic members 51a, 51b, 51c, and 51d; hereinafter these members are also referred to as the elastic members 51) are provided as the elastic members 51. The four elastic members 51 are arranged side by side in a circumferential direction. The four elastic members are arranged at predetermined intervals in the circumferential direction. Specifically, as illustrated in FIG. 5, in the present embodiment, the elastic member 51a is arranged at a rear left part of the protruding part 20. The elastic member 51b is arranged at a rear right part of the protruding part 20. The elastic member 51c is arranged at a front right part of the protruding part 20. The elastic member 51d is arranged at a front left part of the protruding part 20. When a certain elastic member 51 is focused, the elastic member 51 adjacent to the certain elastic member 51 in the circumferential direction is arranged at about a position rotated by 90 degrees about the protruding part 20.

The four elastic members 51 are each arranged at a position apart from the adjacent elastic member 51 in the circumferential direction. In other words, when the vibration generating device 1 is viewed from the side, a part not providing the elastic members 51 is present between the plate 30 and the base 10.

The elastic members 51 can be deformed toward the recessed part 14. The recessed part 14 serves as a space S formed between the plate 30 and the base 10, a space S formed between two adjacent elastic members among the four elastic members 51 in the circumferential direction, and a space S formed inside the base 10. Accordingly, the space S accommodates a part of the deformed elastic members 51. The provision of the space S enables the elastic members 51 to be deformed toward the recessed part 14.

Note that the number of elastic members 51 is not limited to four, but instead may be two or three. Five or more elastic members 51 may be provided. As described below, the elastic members 51 may be annularly formed. The elastic members 51 need not necessarily be arranged between the flange part 15 and the plate 30, but instead the elastic members 51 may be arranged between the upper surface of the coil 40 and the plate 30, or may be arranged between the upper surface of the protruding part 20 and the plate 30.

In the present embodiment, the plate 30 and the base 10 constitute a magnetic circuit. The plate 30 is located close to the flange part 15 at a predetermined interval from the flange part 15 in the outer peripheral part, and is located close to the protruding part 20 at a predetermined interval from the protruding part 20 in the central part. Accordingly, the plate 30 and the base 10 including the protruding part 20 constitute the magnetic circuit. The plate 30 and the base 10 are spaced apart from each other by an amount equal to the thickness of the elastic member 51, and a magnetic gap corresponding to the thickness of the elastic member 51 is provided at the magnetic circuit. It is preferable for the magnetic gap to be as small as possible in terms of an increase in the amplitude of the plate 30 (in terms of increasing the magnetism efficiency of the magnetic circuit).

The vibration generating device 1 is driven by repeatedly switching a state such that a current flows through the coil 40 and a state of no current flowing through the coil 40. Specifically, the vibration generating device 1 can generate a vibration by repeatedly magnetizing and demagnetizing the electromagnet formed with the coil 40 and the base 10.

When the current flows through the coil 40, the base 10 is excited. Accordingly, the upper part of the base 10 and the flange part 15 serve as a magnetic pole part, and magnetize the plate 30 constituting the magnetic circuit. A relatively strong magnetic attraction force is generated between the upper part of the base 10 and the central part of the plate 30, and between the flange part 15 and the outer peripheral part of the plate 30. Thereby the plate 30 is attracted to the base 10. Accordingly, the plate 30 is displaced downward to the base 10 while the elastic members 51 are compressed, so that the interval between the plate 30 and the base 10 is reduced. When the elastic members 51 are compressed at a state of no current flowing through the coil 40, a restoring force is generated and the plate 30 is urged in a direction apart from the base 10. Accordingly, a maximum amount of displacement of the plate 30 is obtained at a position, in the position the magnetic attraction force and the restoring force of the elastic member 51 are balanced. In the present embodiment, the upper part of the base 10 serves as the protruding part 20. Note that the upper part of the base 10 is not limited to the protruding part 20. The upper part of the base 10 may be a region located at a position closer to the plate 30 than the bottom part 14a of the base 10.

When the state is switched from the state such that a current flows through the coil 40 to the state of no current flowing through the coil 40, the magnetism disappears and the magnetic attraction force also disappears. Thus, the restoring force of the elastic members 51 compressed with the displacement of the plate 30 with respect to the base 10 acts on the plate 30, so that the plate 30 is displaced upward with respect to the base 10. As a result, the interval between the plate 30 and the base 10 is increased.

When the state a current flowing through the coil 40 and the state of no current flowing through the coil 40 are repeatedly switched, the plate 30 is repeatedly displaced in the up and down direction with respect to the base 10. In other words, the plate 30 is displaced in the direction away from or closer to the base 10. Thus, the vibration generating device 1 can generate a vibration force. Examples of the direction away from or closer to the base 10 include a direction that the plate 30 vibrates with respect to the base 10, and the thickness direction of the plate 30 or the base 10.

In the present embodiment, the outer peripheral part of the plate 30 faces the flange part 15 of the base 10. Accordingly, in the outside part of the coil 40, a magnetic flux passing through the magnetic circuit is less likely to leak (a magnetic resistance decreases), and a strong magnetic attraction force is generated. Thus, the efficiency of the vibration generating device 1 can be improved. The plate 30 serving as a vibration surface can be increased by an amount equal to the size of the flange part 15. Therefore, the vibration can be efficiently transmitted to the electronic device 1001 and the like.

The elastic members 51 are arranged sandwiched between the plate 30 and the base 10. With this structure, the plate 30 and the base 10 are not brought into contact with each other even when a current flows through the coil 40. Accordingly, at the time of driving the vibration generating device 1, generation of abnormal noise due to contact between the plate 30 and the base 10 can be prevented.

When the vibration generating device 1 is viewed from the side of the vibration generating device 1, a space where the elastic members 51 are not arranged is present between the plate 30 and the flange part 15. Accordingly, when the plate 30 is displaced downward with respect to the base 10 and the elastic members 51 are compressed, the elastic members 51 can be deformed and extend not only in the radial direction, but also in the circumferential direction. A restoring force (also referred to as an elastic force) necessary for the vibration generating device 1 can be obtained by changing the dimensions of the elastic members 51, such as the thickness or width of the elastic members 51. Accordingly, the amount of displacement of the plate 30 with respect to the magnitude of the magnetic attraction force can be increased. The space where the coil 40 is provided and the outside of the vibration generating device 1 communicate with each other through an space where the elastic members 51 are not arranged between the plate 30 and the flange part 15. Accordingly, heat generated by the coil 40 can be effectively radiated.

Note that as indicated by alternate long and two short dashes lines in FIGS. 3 and 4, a weight 30w may be arranged on the upper surface of the plate 30 of the vibration generating device 1. When the weight 30w is arranged on the plate 30, the plate 30 is displaced together with the weight 30w, so that a stronger vibration force can be generated.

Description of Modified Examples of Elastic Members

The elastic members used for the vibration generating device are not limited to the elastic members 51 described above, but instead various forms of elastic members can be used. Specifically, the form of each elastic member may be selected as needed depending on various factors such as the size of the vibration generating device, the magnitude of the magnetic attraction force generated using the coil, or the magnitude of the required vibration force.

A material for the elastic members may be selected as needed depending on the factors as mentioned above. As the elastic members, resin members such as rubber, synthetic resin, a gel member, or a sponge having various types of bubbles can be used. As the elastic members, metallic members including springs such as a plate spring formed with metal and a coil spring can be used. These are merely examples, and various elastic members can be used. The various elastic members are deformable and capable of supporting the plate 30 with respect to the base 10.

A material including a magnetic material may be used for the elastic members. Thus, the elastic members may be used as members constituting the magnetic circuit together with the base and the plate. Consequently, occurrence of magnetic flux leakage in the magnetic circuit can be suppressed (a magnetic resistance can be reduced), and the efficiency of the vibration generating device 1 can be improved.

For example, the elastic members may have the following forms.

Figure 8:
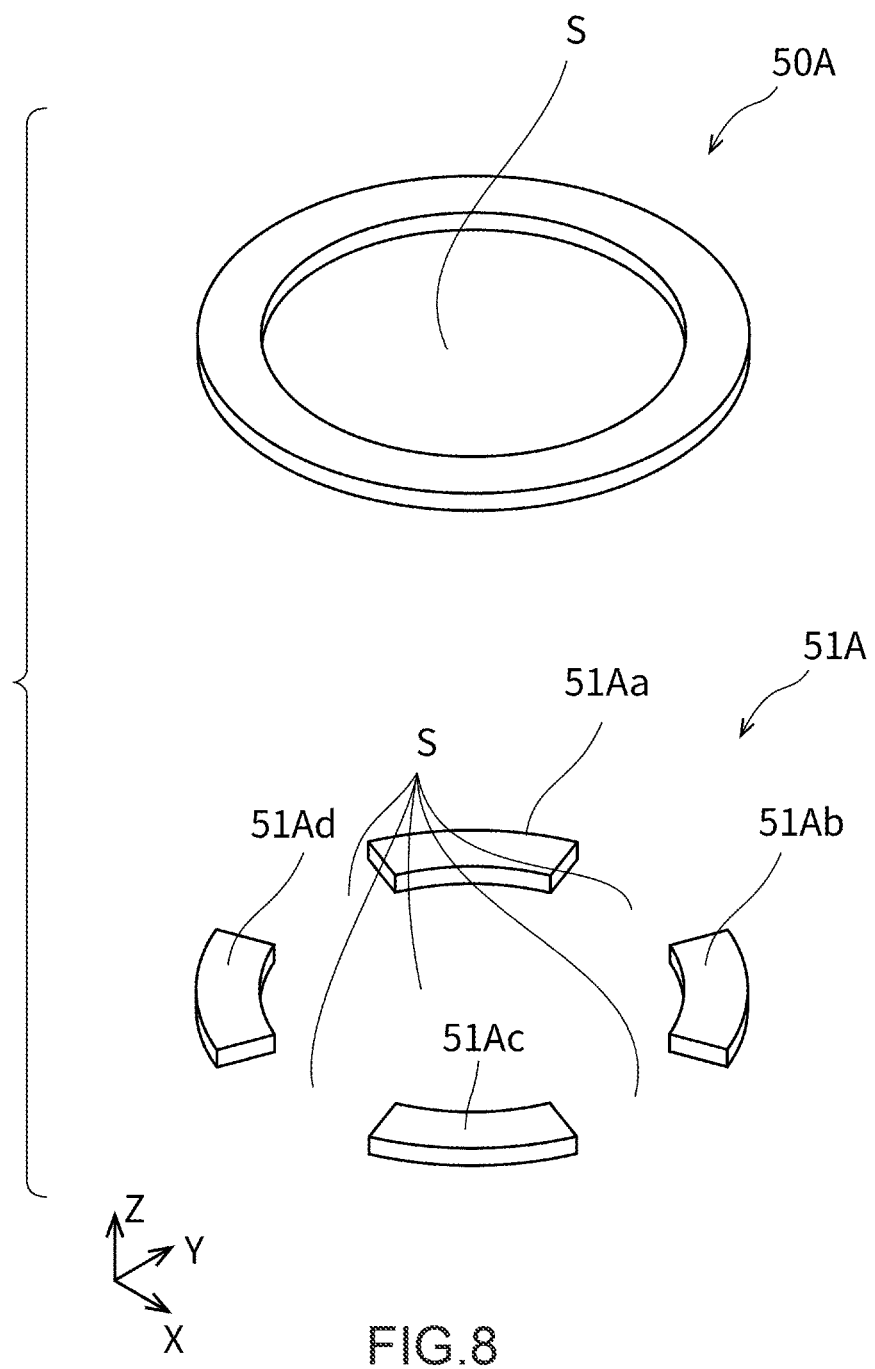
FIG. 8 is a perspective view illustrating an elastic member according to a first modified example.

FIG. 8 is a perspective view illustrating an elastic member according to a first modified example.

An upper part of FIG. 8 illustrates an elastic member 50A annularly formed. A lower part of FIG. 8 illustrates four elastic members 51A (51Aa, 51Ab, 51Ac, and 51Ad) each having a shape constituting a part of the annular elastic member 50A. The four elastic members 51A may be arranged at predetermined intervals in the circumferential direction, like the elastic members 51 described above. The elastic members 50A and 51A are sheet-like resin members each having a restoring force.

The space S is provided inside the annular elastic member 50A. The space S can accommodate a part of the elastic member 50A.

Figure 9:
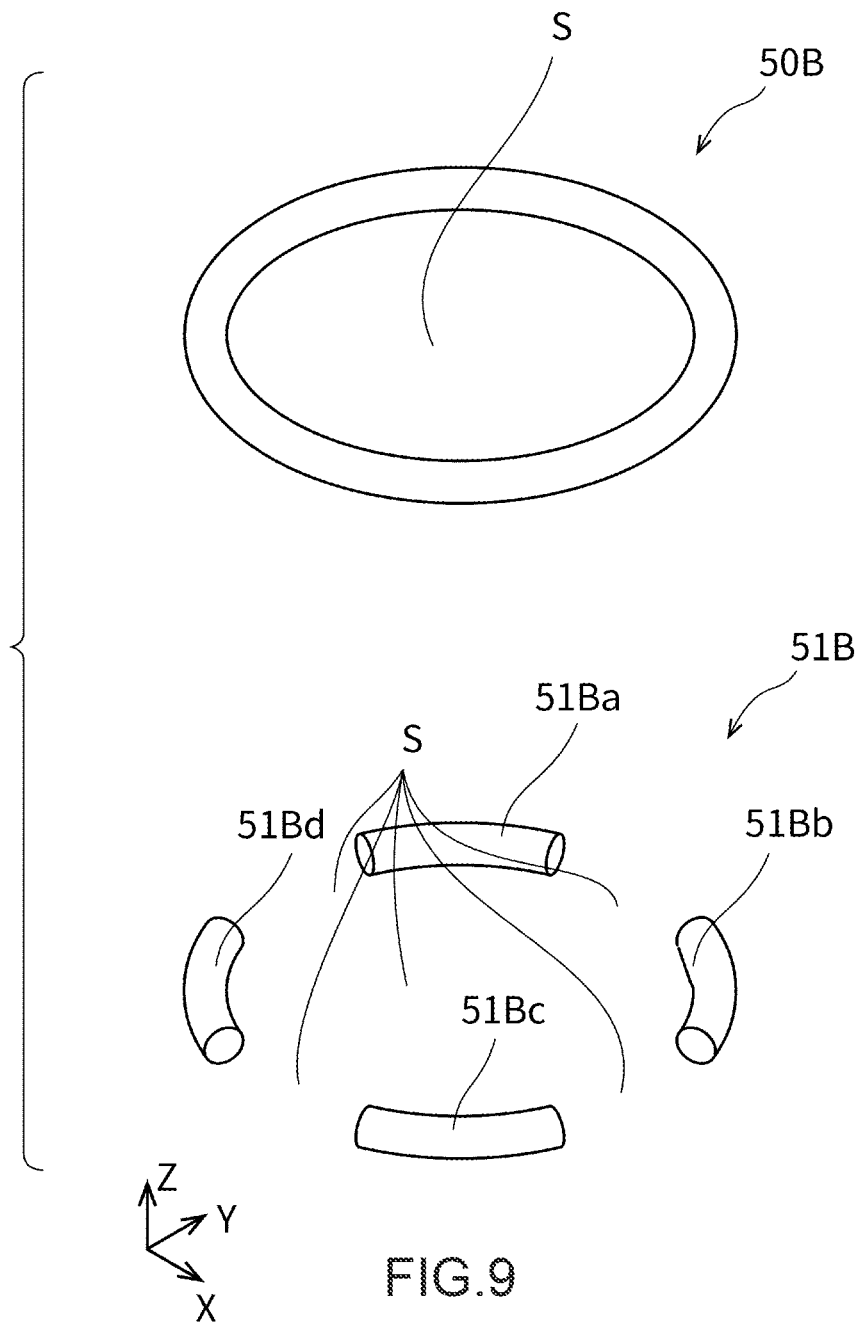
FIG. 9 is a perspective view illustrating an elastic member according to a second modified example.

FIG. 9 is a perspective view illustrating an elastic member according to a second modified example.

An upper part of FIG. 9 illustrates an elastic member 50B annularly formed. A lower part of FIG. 9 illustrates four elastic members 51B (51Ba, 51Bb, 51Bc, and 51Bd) each having a shape constituting a part of the annular elastic member 50B. The four elastic members 51B may be arranged at predetermined intervals in the circumferential direction, like the elastic members 51 described above. The elastic members 50B and 51B are resin members having a circular cross-sectional shape and having a restoring force.

The space S is provided inside the elastic member 50B formed in an annular shape and the elastic members 51B annularly arranged. The space S can accommodate a part of the elastic members 50B and 51B. The space S is provided between two adjacent elastic members 51B among the four elastic members 51B.

Figure 10:
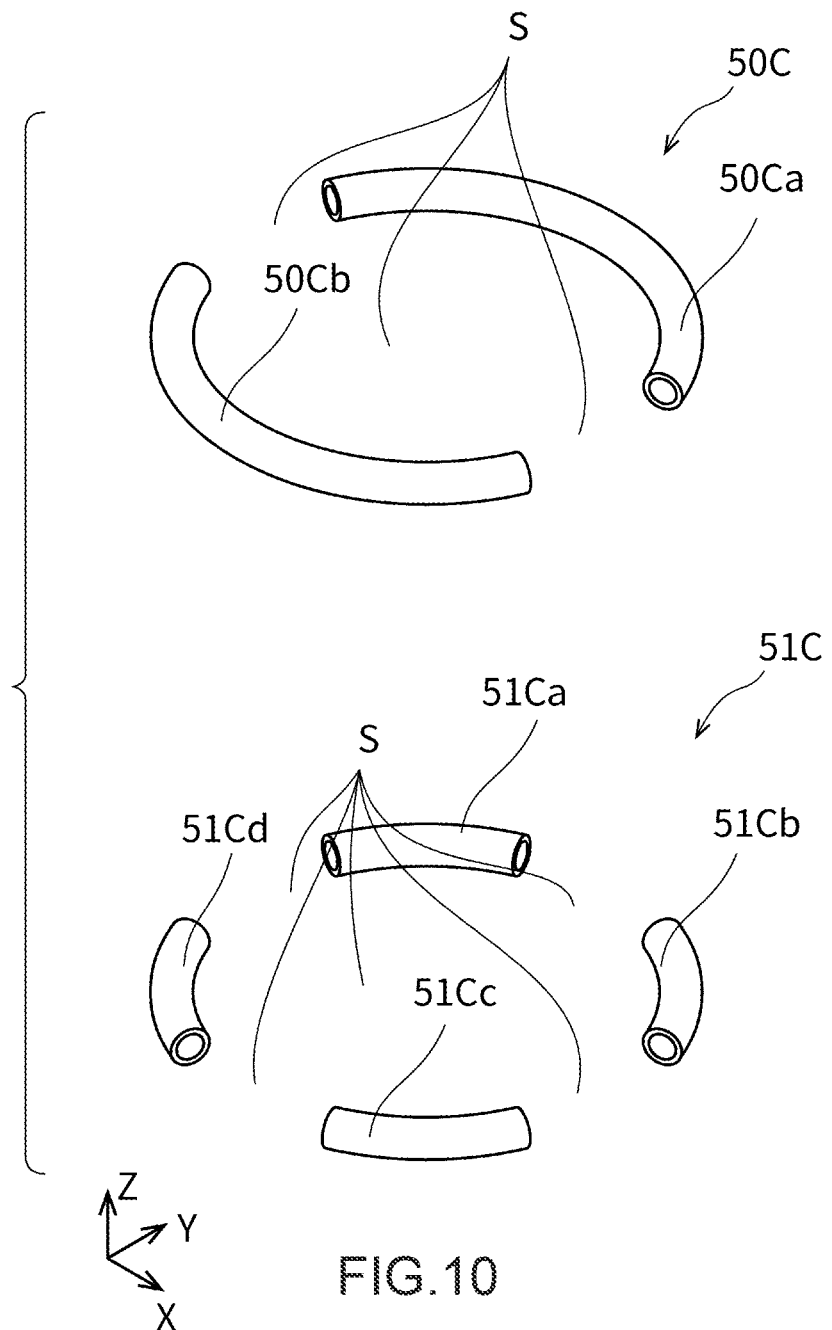
FIG. 10 is a perspective view illustrating an elastic member according to a third modified example.

FIG. 10 is a perspective view illustrating an elastic member according to a third modified example.

An upper part of FIG. 10 illustrates two elastic members 50C (50Ca and 50Cb). Two elastic members 50C (50Ca and 50Cb) are each shorter than a semicircular arc shape. A lower part of FIG. 10 illustrates four elastic members 51C (51Ca, 51Cb, 51Cc, and 51Cd) each having a shape constituting a part of the annular elastic members. The four elastic members 51C may be arranged at predetermined intervals in the circumferential direction, like the elastic member 51 described above. The elastic members 50C and 51C are resin members having a cylindrical pipe shape and having a restoring force. Since the elastic members 50C and 51C have a cylindrical shape, the amount of displacement of the plate 30 with respect to the base 10 can be increased as compared with the elastic members 50B and 51B.

The space S is provided inside the elastic members 50C and 51C annularly arranged. The space S can accommodate a part of the elastic members 50C and 51C. The space S is also provided between two elastic members 50C and between two adjacent elastic members 51C among the four elastic members 51C.

Figure 11:
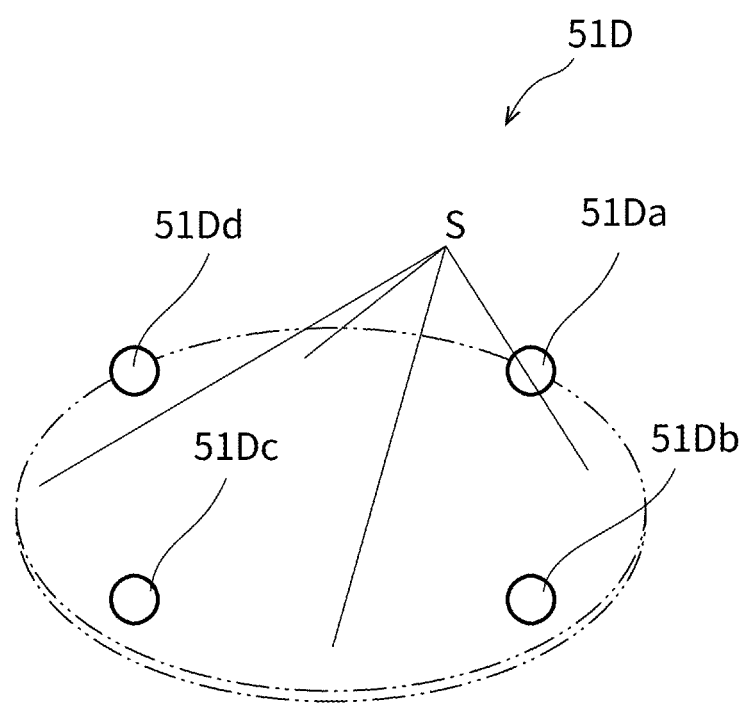
FIG. 11 is a perspective view illustrating an elastic member according to a fourth modified example.

FIG. 11 is a perspective view illustrating an elastic member according to a fourth modified example.

FIG. 11 illustrates four elastic members 51D (51Da, 51Db, 51Dc, and 51Dd). The four elastic members 51D may be arranged at predetermined intervals in the circumferential direction, like the elastic members 51 described above. The elastic members 51D are resin members having a spherical shape and having a restoring force.

The space S that can accommodate a part of the elastic members 51D is provided inside the four elastic members 51D annularly arranged. The space S is also provided between two adjacent elastic members 51D among the four elastic members 51D.

Figure 12:
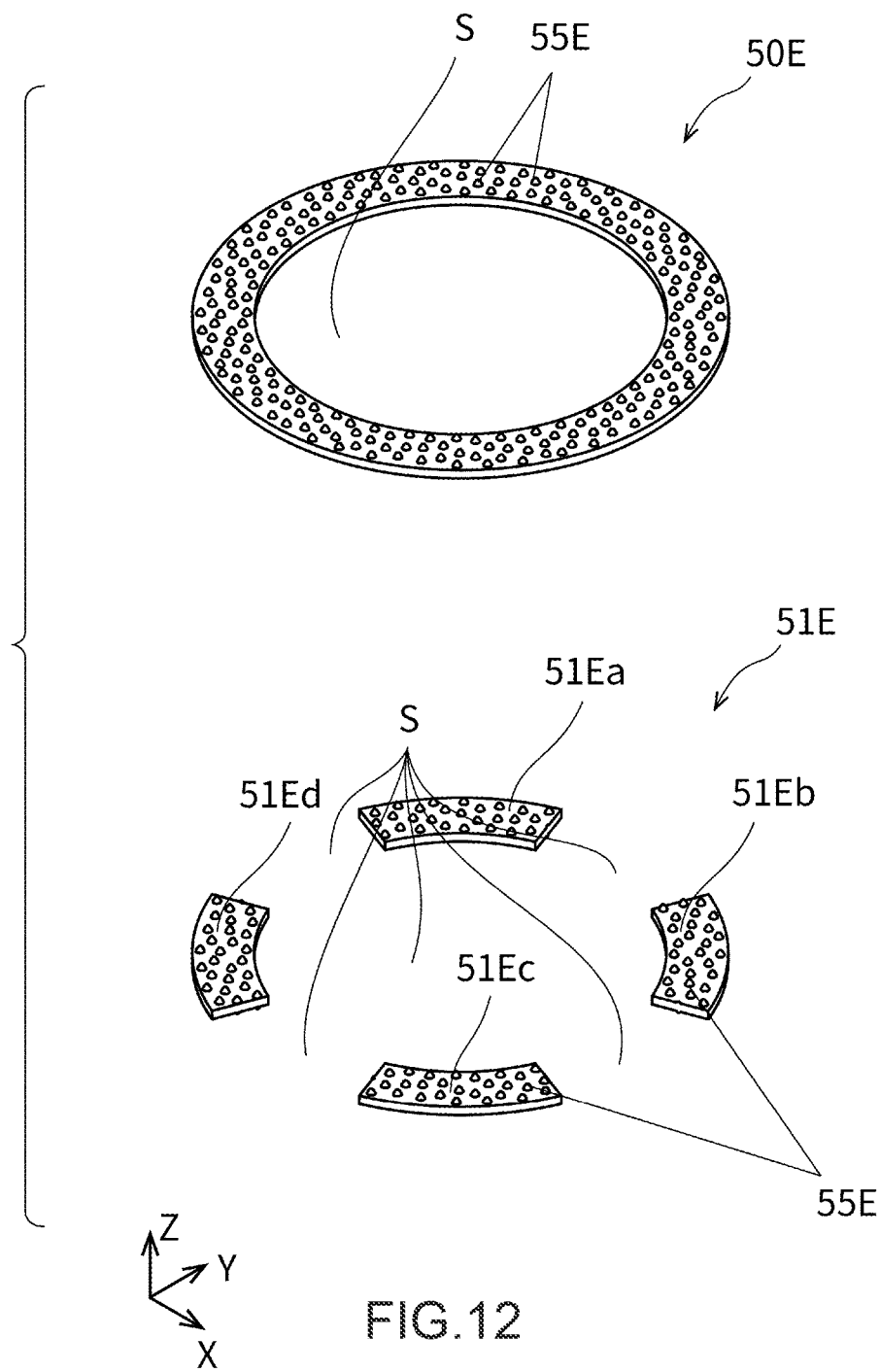
FIG. 12 is a perspective view illustrating an elastic member according to a fifth modified example.

FIG. 12 is a perspective view illustrating an elastic member according to a fifth modified example.

An upper part of FIG. 12 illustrates an elastic member 50E annularly formed. A lower part of FIG. 12 illustrates four elastic members 51E (51Ea, 51Eb, 51Ec, and 51Ed) each having a shape constituting a part of the annular elastic member 50E. The four elastic members 51E may be arranged at predetermined intervals in the circumferential direction, like the elastic members 51 described above. The elastic members 50E and 51E are sheet-like resin members each having a restoring force. The surface of each of the elastic members 50E and 51E has recessed parts and protruding parts. Specifically, a plurality of small projections 55E are provided at the surface of each of the elastic members 50E and 51E. The formation of recessed parts and protruding parts, such as the projections 55E, allow the elastic members 50E and 51E to be deformed in various manners, unlike in a case no recessed parts and no protruding parts formed, when the elastic members 50E and 51E are compressed. Accordingly, the vibration generated by the vibration generating device 1 can be varied.

The space S is provided inside the elastic member 50E formed in an annual shape and the elastic members 51E annularly arranged. The space S can accommodate a part of the elastic members 50E and 51E. The space S is also provided between two adjacent elastic members 51E among the four elastic members 51E.

Figure 13:
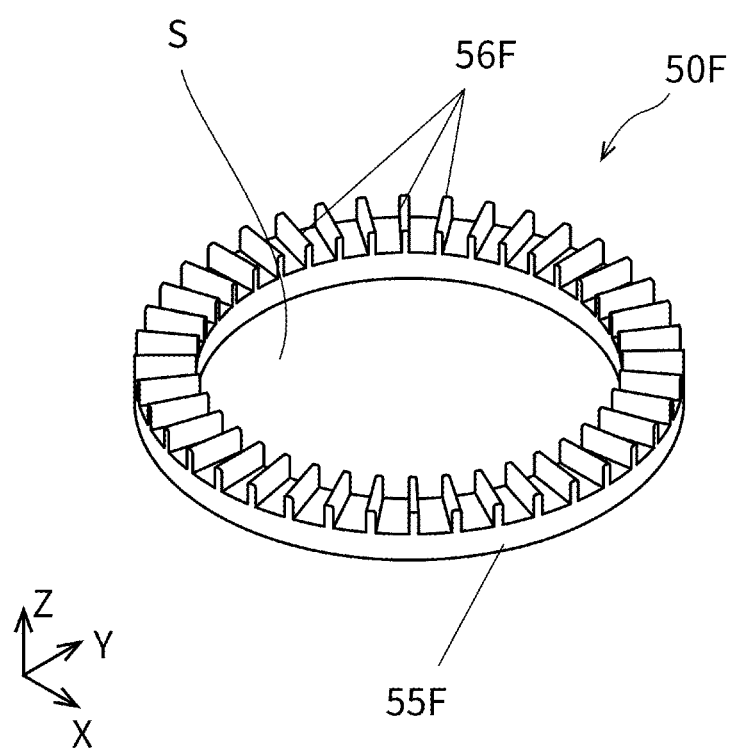
FIG. 13 is a perspective view illustrating an elastic member according to a sixth modified example.

FIG. 13 is a perspective view illustrating an elastic member according to a sixth modified example.

An upper part of FIG. 13 illustrates an elastic member 50F formed in an annular shape. The elastic member 50F is a resin member having a restoring force. The elastic member 50F includes a sheet-like annular part 55F formed in an annual shape, and a plurality of projecting parts 56F projecting upward from the annular part 55F. Each of the projecting parts 56F has a rib shape extending in the radial direction of the elastic member 50F.

The space S is provided inside the elastic member 50F formed in an annual shape. The space S can accommodate a part of the elastic member 50F. The space is also provided between two adjacent projecting parts 56F among the plurality of projecting parts 56F.

The elastic member 50F is used in a state, for example, in the state an upper part of each of the projecting parts 56F contacts the plate 30. When the plate 30 is displaced downward, each of the projecting parts 56F is compressed in the up and down direction. The projecting parts 56F are spaced apart each other in the circumferential direction, and a space is present, in the space the projecting parts 56F can be deformed in the circumferential direction. Each of the projecting parts 56F is likely to be compressed in the up and down direction. Accordingly, the amount of displacement of the plate 30 with respect to the magnitude of the magnetic attraction force can be increased, like in the case of using a plurality of elastic members, by using the integrally formed elastic member 50F. The heat generated by the coil 40 can be radiated.

Whether to use the annularly formed elastic member, or whether to arrange the plurality of elastic members at intervals in the circumferential direction may be selected as needed depending on the intended use or the like of the vibration generating device 1. As described above, when the plurality of elastic members is arranged at intervals in the circumferential direction, the amount of displacement of the plate 30 with respect to the magnitude of the magnetic attraction force can be increased and the heat generated by the coil 40 can be radiated. On the other hand, when the annularly formed elastic member is used, the gap between the plate 30 and the flange part 15 can be eliminated on the inside and outside of the elastic member. Accordingly, the occurrence of a malfunction, such as inhibition of displacement of the plate 30 due to foreign matter entering the inside area of the elastic member can be prevented.

Description of Attaching Structure of Vibration Generating Device 1

Figure 14:
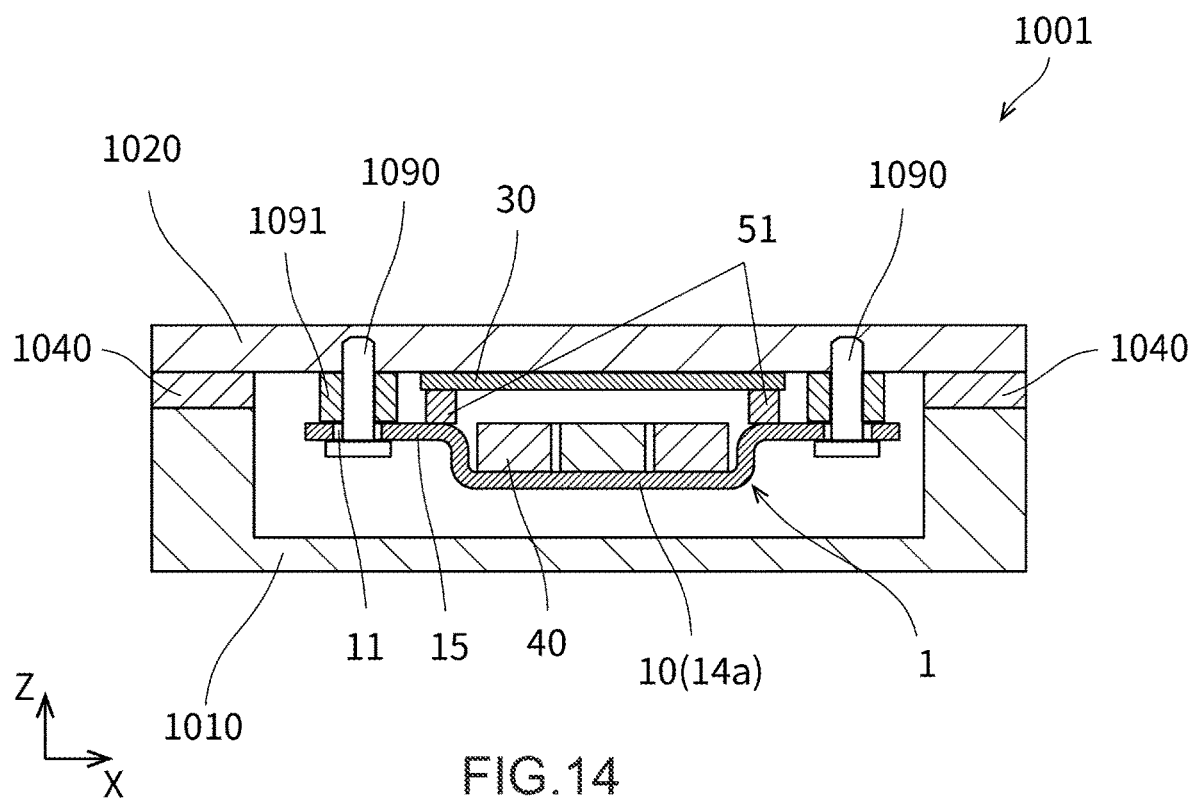
FIG. 14 is a view illustrating a structure for attaching a vibration generating device to an electronic device.

FIG. 14 is a view illustrating a structure for attaching the vibration generating device 1 to the electronic device 1001.

In FIG. 14, the detailed structure is illustrated in a simplified manner for convenience of explanation. FIG. 14 illustrates a state of no current flowing through the coil 40.

In the electronic device 1001, a force sensor (an example of a third elastic member) 1040 is arranged between the contact member 1020 and the housing 1010. Specifically, the contact member 1020 is fixed to the housing 1010 through the force sensor 1040. The force sensor 1040 detects a force for pressing the contact member 1020 against the housing 1010 when the force is applied to the contact member 1020. The force sensor 1040 is formed with an elastic member having elasticity. An elastic member, such as a plate spring, a coil spring, rubber, or synthetic resin, may be arranged instead of the force sensor 1040, or together with the force sensor 1040, between the contact member 1020 and the housing 1010.

The vibration generating device 1 is fixed to the contact member 1020 in a direction, in the direction the upper surface of the plate 30 faces the lower surface of the contact member 1020. The base 10 is fixed to the contact member 1020 with screws 1090 inserted penetrating through the hole parts 11 and spacers 1091, respectively, upward from the lower side of the flange part 15 in a state, for example, in this state the spacers 1091 are sandwiched between the upper surface of the flange part 15 and the contact member 1020.

A gap is formed between the lower surface of the base 10 of the vibration generating device 1 facing the housing 1010 and the upper surface of the bottom surface of the housing 1010 facing the vibration generating device 1.

The plate 30 can be brought into contact with the contact member 1020 and can be spaced apart from the contact member 1020 in a direction away from or closer to the base 10, i.e., in the up and down direction. In the present embodiment, the upper surface of the plate 30 is in contact with the lower surface of the contact member 1020 in a state of no current flowing through the coil 40. Thus, when the plate 30 is in contact with the contact member 1020, the elastic members 51 are more compressed than in a natural state (in a state a force for causing the plate 30 to move away from or closer to the base 10 is not applied). In other words, the elastic members 51 supporting the plate 30 in contact with the contact member 1020 are deformed. Specifically, the vibration generating device 1 is fixed to the contact member 1020 in a state, in the state the plate 30 contacts the contact member 1020, to thereby allow the plate 30 to be slightly pressed against the base 10. When the vibration generating device 1 is fixed to the contact member 1020 and the plate 30 is in contact with the contact member 1020, the elastic members 51 urge the plate 30 against the contact member 1020 in a direction away from or closer to the base 10, and the plate 30 has an effect on the contact member 1020.

Figure 15:
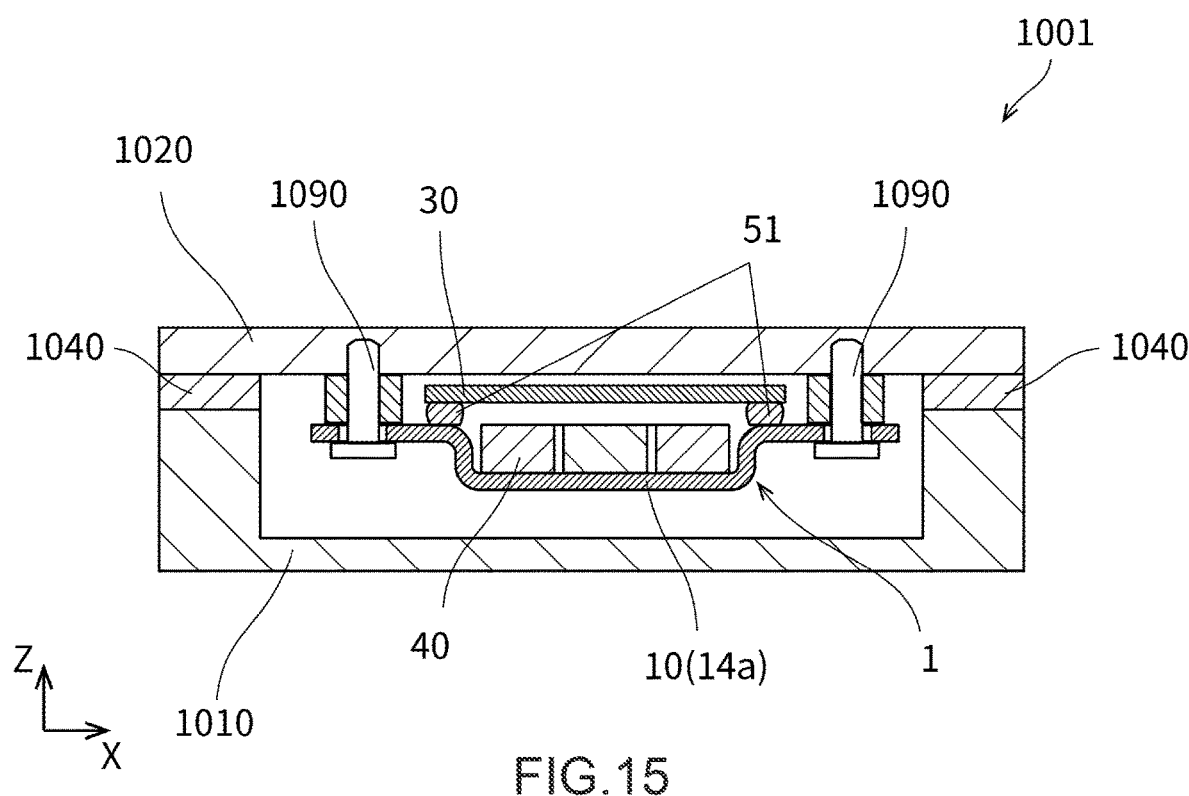
FIG. 15 is a diagram illustrating a vibration generating device in a state, in this state a current flows through a coil.

FIG. 15 is a diagram illustrating the vibration generating device 1 in a state, in this state a current flows through the coil 40.

When the current flows through the coil 40, the plate 30 is displaced and approaches the base 10. At this time, the position of the base 10 is not changed. In other words, at this time, the plate 30 is away (spaced apart) from the contact member 1020 as illustrated in FIG. 15.

After that, when the supply of the current flowing through the coil 40 is stopped, the magnetic attraction force disappears. As a result, the plate 30 is urged upward by the restoring force of the elastic member 51, so that the plate 30 is displaced toward the contact member 1020. When the plate 30 is displaced until the plate 30 contacts the contact member 1020, the plate 30 is stopped in a state, in the state, the plate 30 contacts the contact member 1020 and returns to the state illustrated in FIG. 14.

In this manner, the current to be caused to flow through the coil 40 is repeatedly supplied or stopped, thereby repeatedly generating the state illustrated in FIG. 14 and the state illustrated in FIG. 15. When the back and forth displacement of the plate 30 is repeated, a vibration due to a reaction that is caused by the contact member 1020 and acts on the plate 30 is generated and the vibration is transmitted to the contact member 1020. The contact member 1020 is coupled to the housing 1010 through the force sensor 1040 as an elastic member, and thus the contact member 1020 is allowed to be slightly displaced with respect to the housing 1010. The vibration is also transmitted to the housing 1010. Thereby, a user using the electronic device 1001 can feel the vibration.

When the supply of the current flowing through the coil 40 is stopped and the plate 30 contacts the contact member 1020, the plate 30 can be swiftly contacted with the contact member 1020. An impact can be generated on the contact member 1020. This enables the user to feel a relatively specific feeling such as a click.

Note that the attaching structure of the vibration generating device 1 is not limited to this. The vibration generating device 1 can be used not only for the electronic device 1001, but also for various electronic devices.

For example, the vibration generating device 1 may be attached to the housing, instead of being attached to the contact member of the electronic device.

Figure 16:
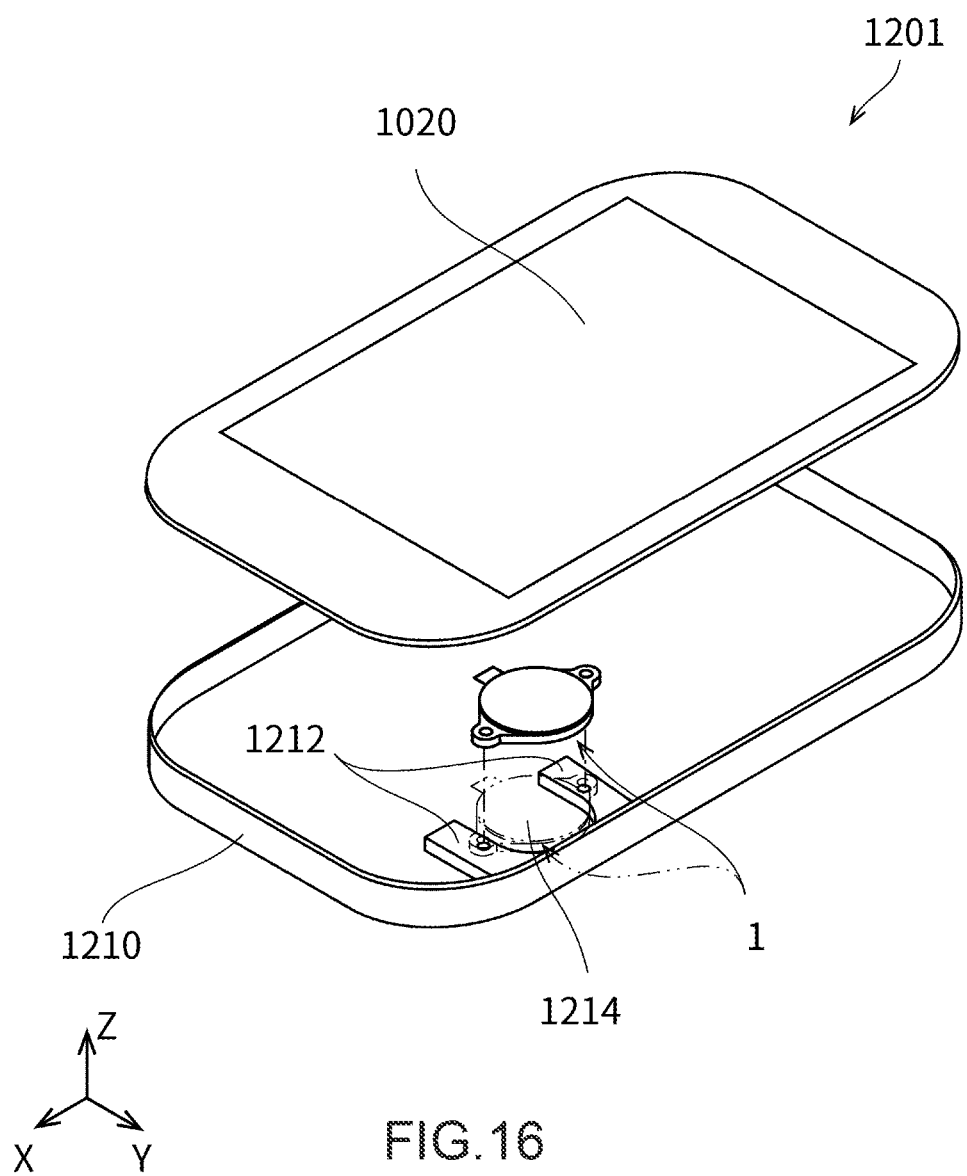
FIG. 16 is a perspective view illustrating a first modified example of the attaching structure for attaching the vibration generating device.
Figure 17:
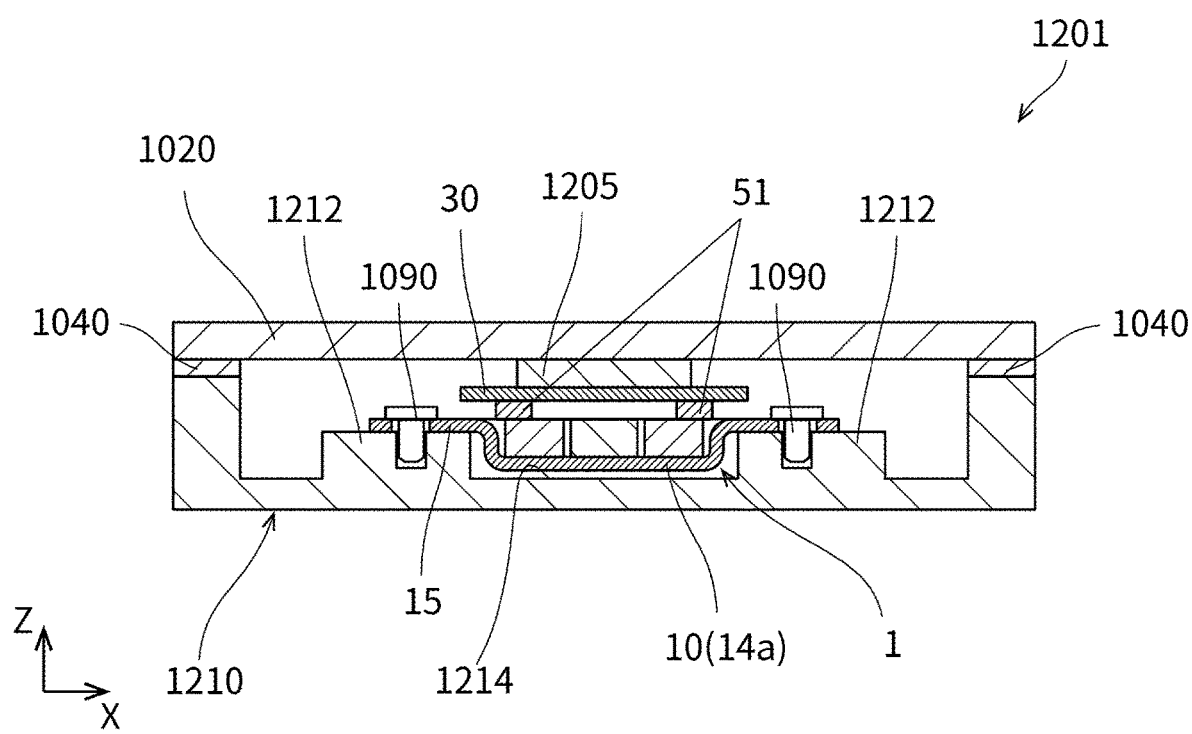
FIG. 17 is a sectional view illustrating the first modified example of the attaching structure for attaching the vibration generating device.

FIG. 16 is a perspective view illustrating a first modified example of the attaching structure of the vibration generating device 1. FIG. 17 is a sectional view illustrating the first modified example of the attaching structure of the vibration generating device 1.

As illustrated in FIGS. 16 and 17, the electronic device 1201 is, for example, a so-called smartphone. The electronic device 1201 includes the contact member 1020, a housing 1210, the force sensor 1040, and the vibration generating device 1. Unlike in the electronic device 1001 described above, in the electronic device 1201, the vibration generating device 1 is attached to the housing 1210, instead of being attached to the contact member 1020.

As illustrated in FIG. 17, inside the housing 1210 an attaching part 1212 is formed inside the housing 1010 to attach the vibration generating device 1. The attaching part 1212 has a recess 1214 at a central part of the attaching part 1212. The attaching part 1212 is raised to a position higher than the recess 1214 to support the flange part 15 of the vibration generating device 1. The vibration generating device 1 is attached to the attaching part 1212 by attaching the screws 1090 penetrating through the hole parts 11, respectively, from the upper side, in a state. In this state a region of the flange part 15 is placed on the attaching part 1212. In the region the hole parts 11 of the flange part 15 are provided.

In this modified example, dimensions from the upper surface of the attaching part 1212 to the upper surface of the recess 1214 are slightly larger than dimensions from the lower surface of the flange part 15 of the vibration generating device 1 to the lower surface of the recessed part 14. Accordingly, a gap is formed between the surface (in this case, the lower surface of the recessed part 14) of the vibration generating device 1 facing the housing 1210 and the surface (in this case, the upper surface of the recessed part 1214) of the housing 1210 facing the vibration generating device 1.

The plate 30 of the vibration generating device 1 sandwiches an elastic member 1205 (second elastic member) by the contact member 1020 across. In other words, the elastic member 1205 is provided between the plate 30 and the contact member 1020. Further, the elastic member 1205 is coupled or fixed to each of the plate 30 and the contact member 1020 directly or through other member, such as an adhesive. The elastic member 1205 is a member having a cushioning property. The elastic member 1205 is, for example, a resin member such as rubber or synthetic resin. Since the elastic member 1205 is provided, the vibration generated by the vibration generating device 1 is slightly reduced by the elastic member 1205 and is also transmitted to the contact member 1020. When the housing 1210, the force sensor 1040, and the contact member 1020 are assembled, a tolerance between the dimensions of the housing 1210 and the contact member 1020 is relatively large. The tolerance can be allowed by the elastic member 1205 and a force associated with the displacement of the plate 30 can be applied to the contact member 1020.

If necessary, the plate 30 may be coupled or fixed to the contact member 1020 directly or through other member, such as an adhesive, without providing the elastic member 1205.

Figure 18:
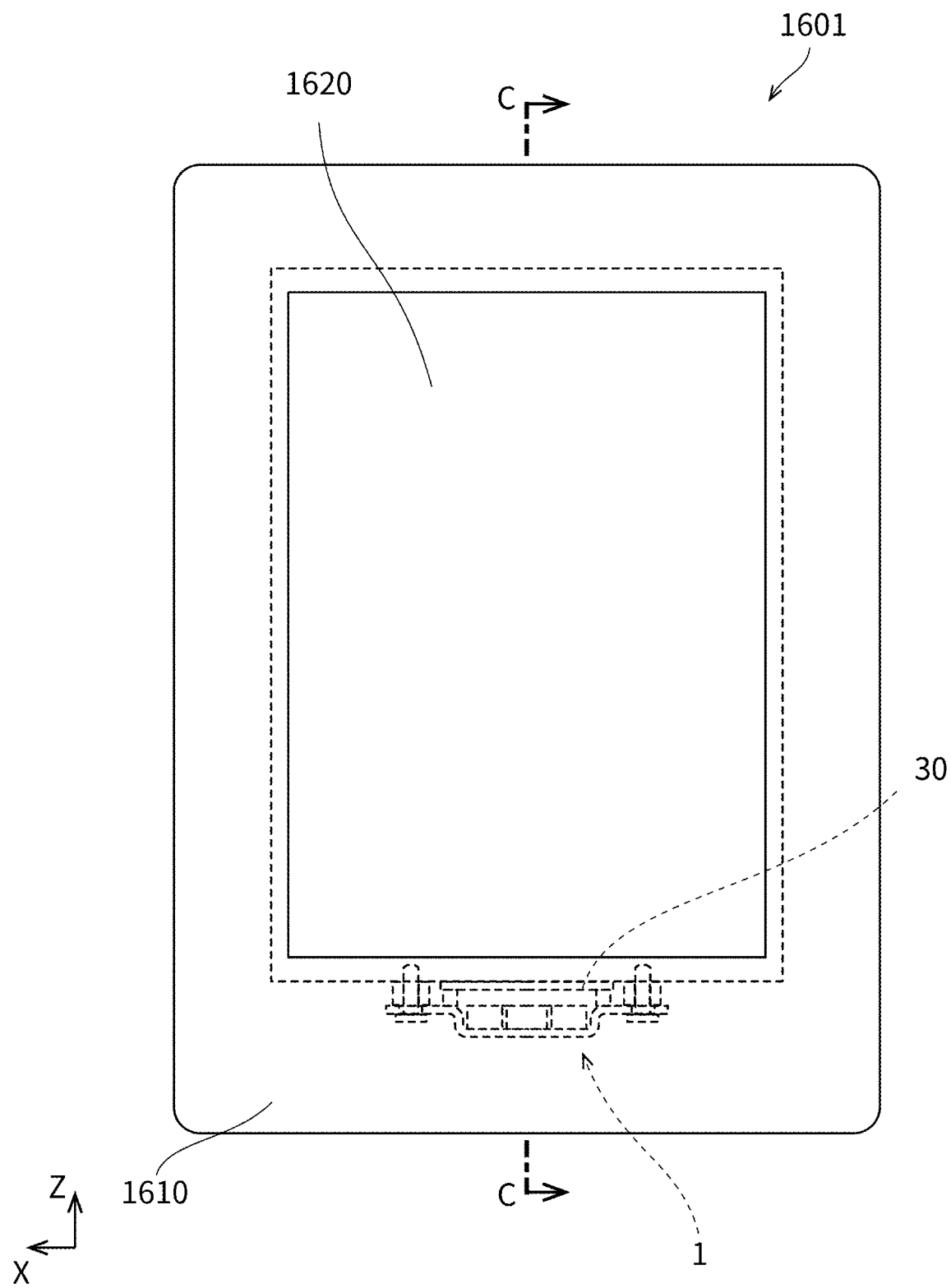
FIG. 18 is a plan view illustrating the second modified example of the attaching structure for attaching the vibration generating device.
Figure 19:
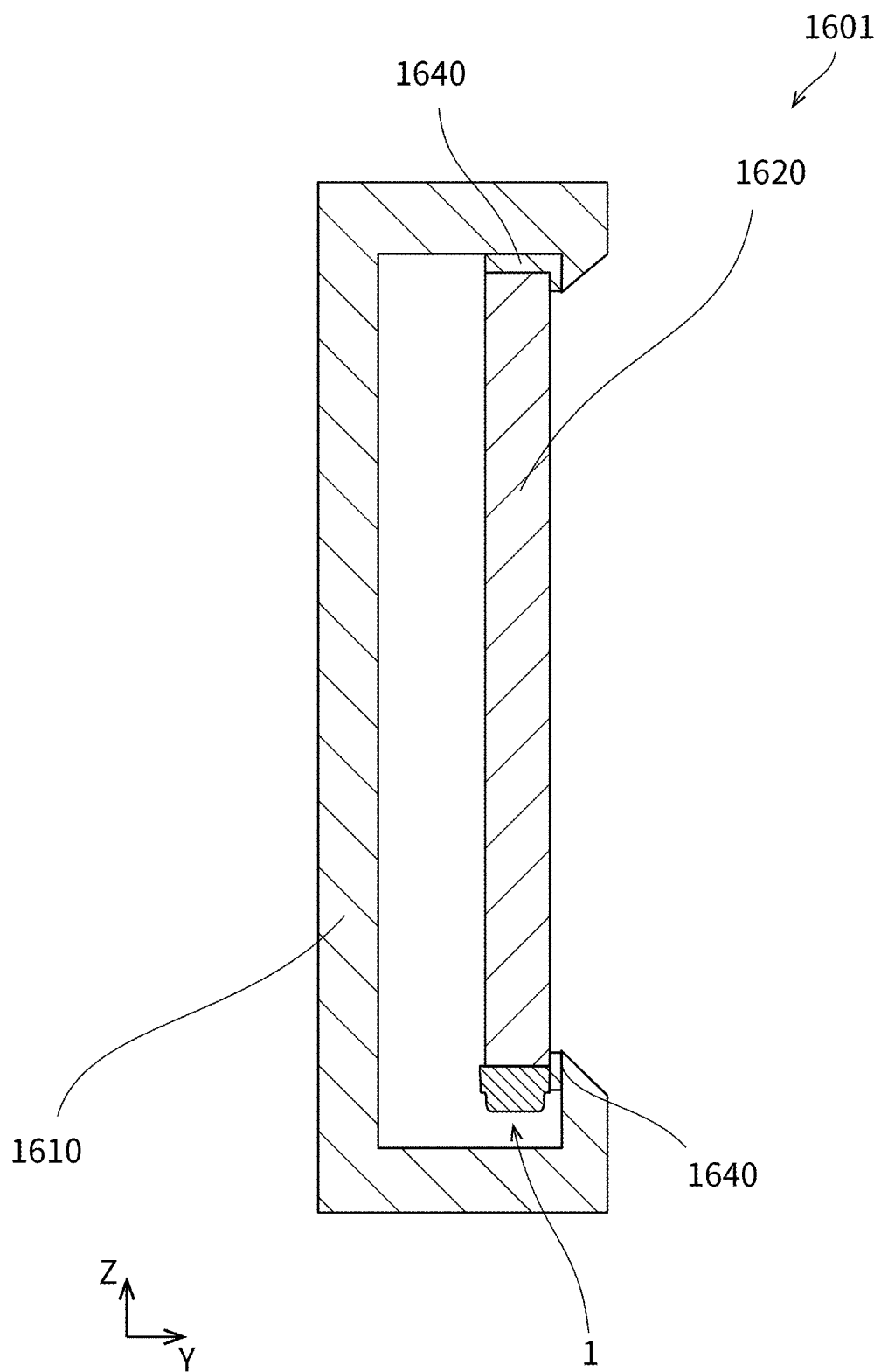
FIG. 19 is a sectional view taken along a line C-C in FIG. 18.

FIG. 18 is a plan view illustrating a second modified example of the attaching structure of the vibration generating device. FIG. 19 is a sectional view taken along a line C-C in FIG. 18.

As illustrated in FIGS. 18 and 19, an electronic device 1601 is, for example, a so-called tablet electronic computer. The electronic device 1601 includes a contact member 1620, a housing 1610, an elastic member 1640, and the vibration generating device 1. The contact member 1620 is a touch panel. The elastic member 1640 is, for example, an elastic member such as rubber or synthetic resin, and is arranged between the contact member 1620 and the housing 1610. The elastic member 1640 is arranged in such a manner. In this manner, for example, the elastic member 1640 surrounds the outer peripheral part of the contact member 1620.

As illustrated in FIG. 18, in the electronic device 1601, the vibration generating device 1 is fixed to the outer peripheral part of the contact member 1620. Specifically, the vibration generating device 1 is coupled to the contact member 1620 in such a manner. In the manner the plate 30 contacts a part of the outer peripheral part of the contact member 1620. As illustrated in FIG. 19, a gap is formed between the surface of the base 10 of the vibration generating device 1 and the inner surface of the housing 1610. In FIG. 19, the illustration of the inside structure of the vibration generating device 1 is omitted.

Thus, even when the vibration generating device 1 is fixed to the outer peripheral part of the contact member 1620, the vibration generated by the vibration generating device 1 can be transmitted to the contact member 1620 and the vibration generating device 1 can be used.

Figure 20:
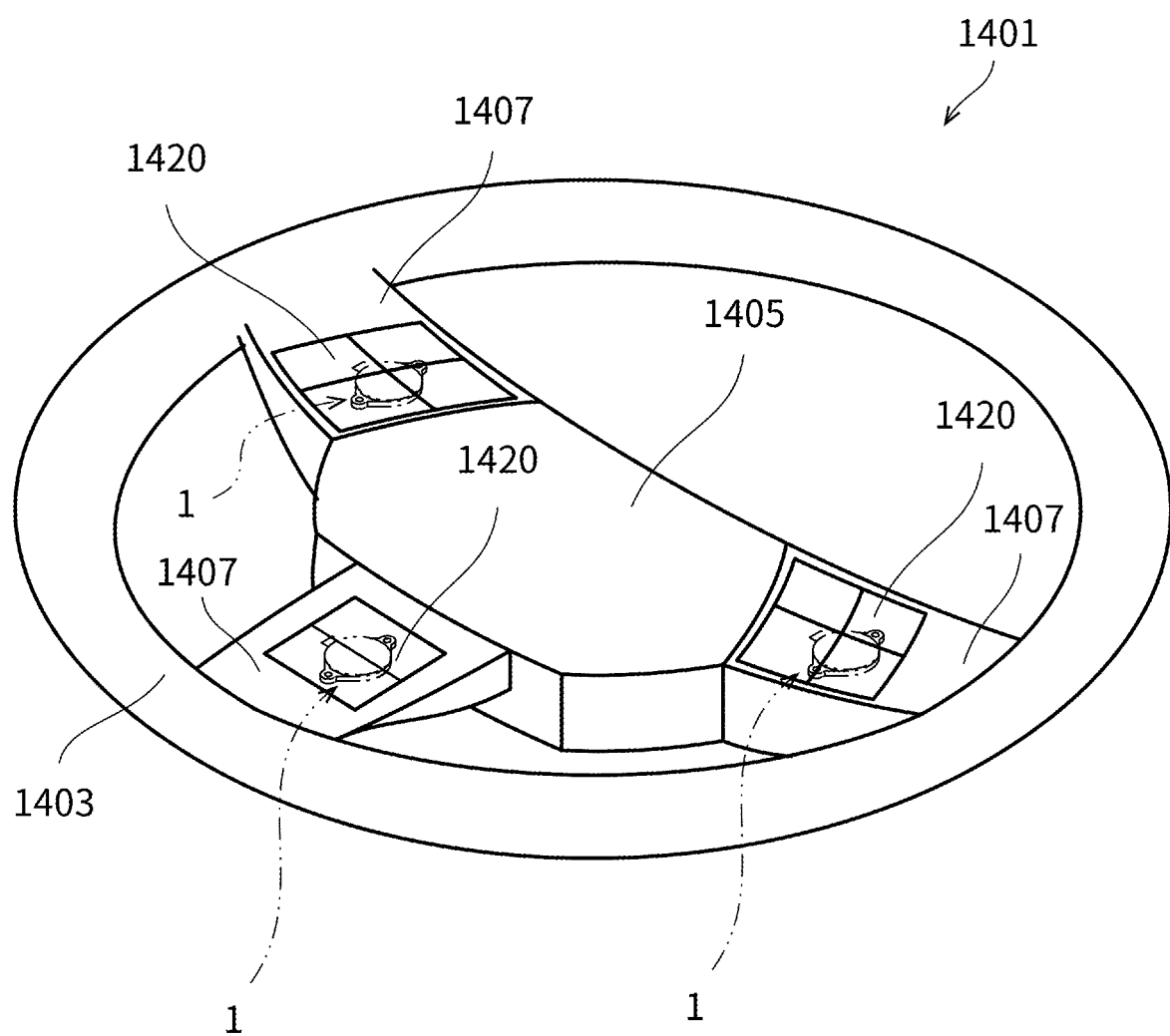
FIG. 20 is a perspective view illustrating a modified example of an electronic device.

FIG. 20 is a perspective view illustrating a modified example of the electronic device.

As illustrated in FIG. 20, an electronic device 1401 is, for example, a steering wheel of an automobile. The electronic device 1401 includes contact members 1420 in three spoke parts 1407, respectively, connecting a hub 1405 and a handle 1403 to each other. Each of the contact members 1420 is, for example, an operation input part formed with a plurality of operating switches for selecting or adjusting various functions of the automobile. The vibration generating device 1 is attached to a back part of each of the contact members 1420. The use of the vibration generating device 1 enables generation of a vibration according to an operation of each operating switch of the contact members 1420, thereby making it possible to provide the user with a feedback accommodating to the operation.

As described above, according to the first embodiment, the vibration generating device 1 has a thin structure including the base 10, the coil 40, the plate 30, and the elastic member 51. Therefore, the vibration generating device 1 having a relatively large vibration surface can be downsized. In the vibration generating device 1, the base 10 and the plate 30 constitute the magnetic circuit. This vibration generating device makes it possible to effectively generate a large vibration. The flange part 15 is provided at the base 10 and the plate 30 is provided facing the flange part 15 in the vibration generating device. Thereby, a magnetic flux is less likely to leak (a magnetic resistance can be reduced) between the plate 30 and the flange part 15 as a magnetic pole part, and a larger vibration can be generated.

A plurality of elastic members 51 having equal vertical dimensions (thickness) is arranged between the plate 30 and the base 10. Accordingly, the plate 30 can be displaced while the horizontal posture of the plate 30 is maintained.

Second Embodiment

A basic structure of a vibration generating device according to a second embodiment is the same as that of the first embodiment, and thus a repeated description is omitted. The components of the second embodiment having substantially the same shape or function as that of the first embodiment are denoted by the same reference numerals, and descriptions of these components may be omitted. In the second embodiment, the form arranging the elastic members, the structure of the base, and the like are different from those of the first embodiment.

Figure 21:
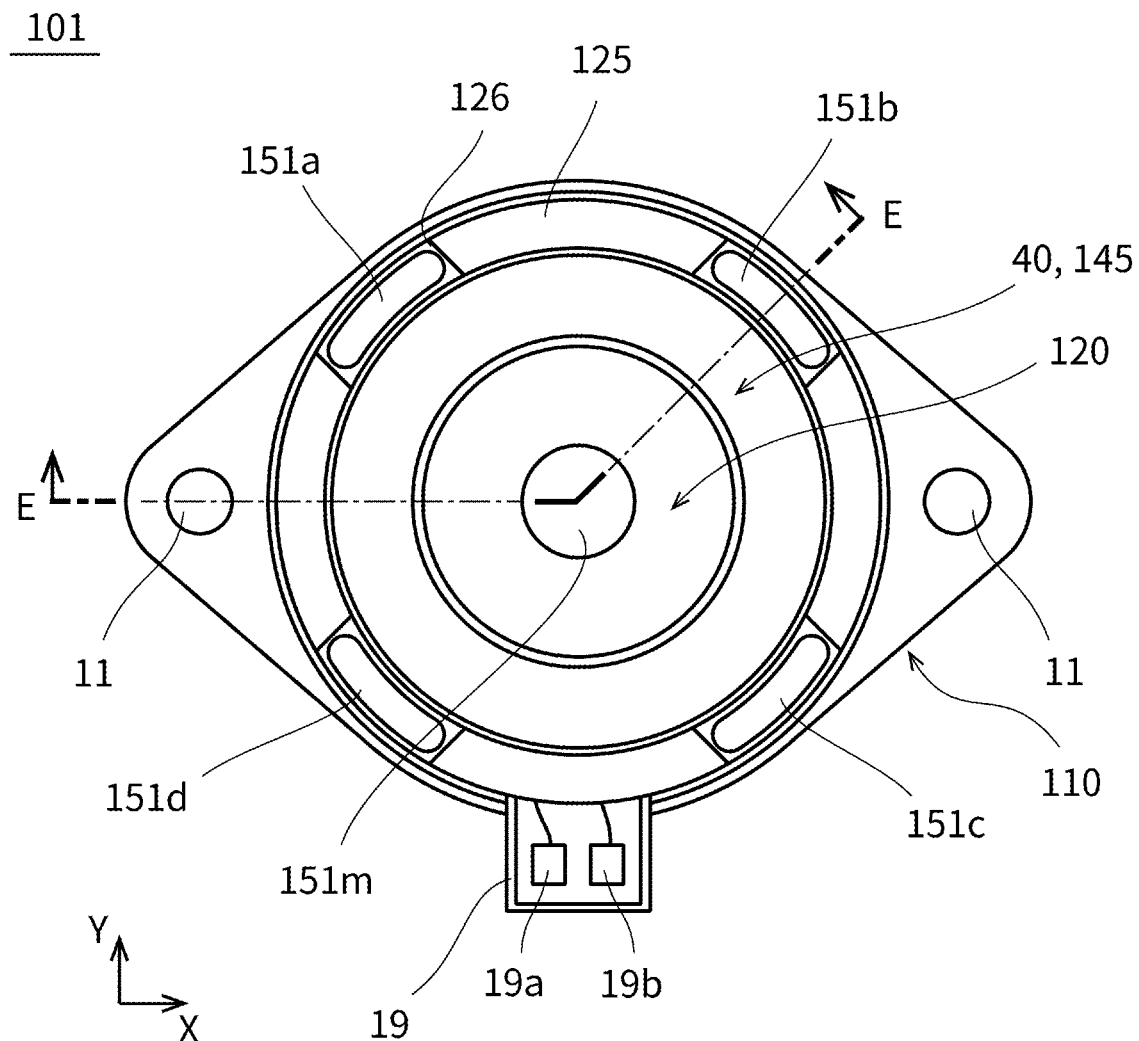
FIG. 21 is a plan view illustrating a vibration generating device according to a second embodiment.
Figure 22:
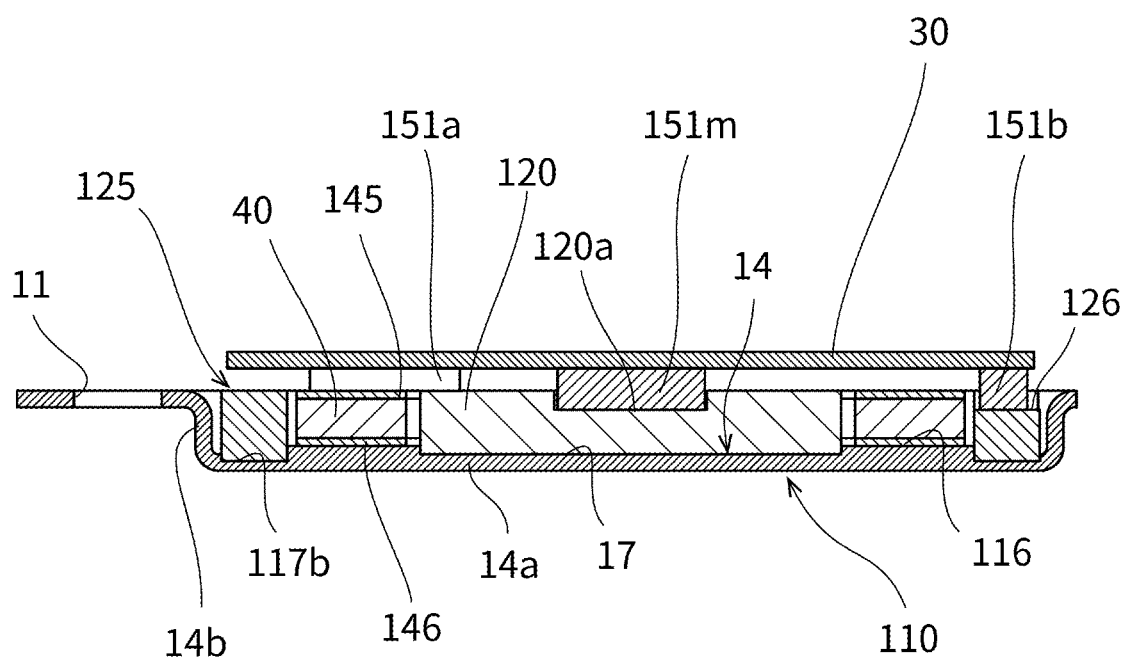
FIG. 22 is a sectional view taken along a line E-E in FIG. 21.

FIG. 21 is a plan view illustrating a vibration generating device 101 according to a second embodiment. FIG. 22 is a sectional view taken along a line E-E in FIG. 21.

In FIG. 21, the illustration of the plate 30 is omitted for convenience of explanation of the inside structure of the vibration generating device 101. Specifically, in the plan view of the vibration generating device 101, components hidden behind the plate 30 are also indicated by solid lines in FIG. 21.

As illustrated in FIGS. 21 and 22, the vibration generating device 101 includes a base 110, a plate 30, a coil 40, and elastic members 151 (151a, 151b, 151c, 151d, and 151m).

In the second embodiment, a center protruding part 120 and an outer protruding part 125 are attached to the base 110. The center protruding part 120 is arranged in the dent 17 at the central part of the recessed part 14 of the base 110, like the protruding part 20 of the first embodiment. The outer protruding part 125 is an annular member. The outer protruding part 125 is formed and arranged surrounding the outer periphery of the coil 40 on the outside of the outer periphery of the coil 40. An annular dent 117b to fix the outer protruding part 125 is formed in the bottom part 14a of the recessed part 14 of the base 110. Like the protruding part 20, the center protruding part 120 and the outer protruding part 125 are formed with a magnetic body. For example, the center protruding part 120 and the outer protruding part 125 are formed with iron. The base 110 is excited when a current flows through the coil 40, and each of an upper part of the center protruding part 120 and an upper part of the outer protruding part 125 serves as a magnetic pole part.

The center protruding part 120 and the outer protruding part 125 are each formed in such a manner. In this manner the upper surface of each of the center protruding part 120 and the outer protruding part 125 is at the same height as the upper surface of the base 110. The plate 30 is arranged in such a manner. In this manner the outer peripheral part of the plate 30 faces the upper surface of the outer protruding part 125. Note that the wide flange part 15 arranged surrounding the outer periphery of the recessed part 14 is not provided at the base 110, unlike in the first embodiment, and only the right and left side parts of the recessed part 14 provided with the hole parts 11, respectively, extend in a flange shape.

A dent 120a arranging the elastic member 151m (hereinafter also referred to especially as the center elastic member 151m) is formed at a central part of the upper surface of the center protruding part 120. Four dents 126 are provided at the outer protruding part 125. The elastic members 151a, 151b, 151c, and 151d (which may be collectively referred to as the outer elastic members 151) respectively are arranged at the four dents 126. In the second embodiment, the outer elastic members 151 are arranged substantially at regular intervals in the circumferential direction, like the elastic members 51 in the first embodiment. The depths of the dents 120a and 126 are, for example, uniform, but instead the depth of the dent 120a and the depth of the dent 126 may be different from each other.

In the base 110, a coil arrangement part 116 slightly raised upward is disposed between the dent 17 and the dent 117b arranging the outer protruding part 125. The center protruding part 120 are arranged at the dent 17. The outer protruding part 125 is arranged at the dent 117b. The coil 40 is arranged on or above the coil arrangement part 116. With this structure, the vibration generating device 1 having a vibration surface with a constant size, while the volume of the coil 40 is reduced as needed. In the magnetic circuit formed with the base 110 and the plate 30, the occurrence of magnetic flux saturation in the bottom part 14a can be prevented. The coil arrangement part 116 may be provided adjusting the height of the upper surface of the coil 40 to be equal to the height of the upper surface of the center protruding part 120.

A film (resin film) 145 having insulation properties is arranged at the upper surface of the coil 40. A film (resin film) 146 having insulation properties is arranged between the lower surface of the coil 40 and the coil arrangement part 116 in a lower surface of the coil 40. The films (resin films) 145 and 146 having insulation properties are, for example, resin members each having insulation properties. With this structure, the insulation between the coil 40 and the base 110 and the insulation between the coil 40 and the plate 30 can be reliably ensured.

In the second embodiment, the base 110 includes the center protruding part 120 and the outer protruding part 125, and the outer peripheral part of the plate 30 is arranged facing the upper surface of the outer protruding part 125. Accordingly, the plate 30, the center protruding part 120 of the base 110, the outer protruding part 125, and the bottom part 14a constitute the magnetic circuit. Therefore, the vibration generating device 101 can be operated in the same manner as in the first embodiment described above. The vibration generating device 101 according to the second embodiment can be used for various electronic devices, like in the first embodiment described above.

Since the outer protruding part 125 having a relatively large width can be used, the diameter of the plate 30 can be increased by an amount equal to the width of the outer protruding part 125, thereby making it possible to improve the efficiency of the vibration generating device 101 while increasing the vibration surface.

Further, since the dents 120a and 126 are formed in the center protruding part 120 and the outer protruding part 125, respectively, the interval between the plate 30 and the upper surface of the base 110 can be reduced and a larger height of the elastic member 151 in the up and down direction can be ensured. When the plate 30 is displaced toward the base 110 and the elastic member 151 is compressed, a degree generating the force of resisting the displacement of the plate 30 at the elastic member 151 increases as the amount of displacement of the plate 30 increases. However, the degree decreases as the length in the up and down direction of the elastic member 151 in the natural state increases. Accordingly, when a current flows through the coil 40, the magnitude of the magnetic attraction force that acts between the plate 30 and the base 110 can be increased and the elastic member 151 can be easily compressed.

The center elastic member 151m is deformed and compressed while being expanded in the radial direction in accordance with the downward displacement of the plate 30 with respect to the base 110. Accordingly, the plate 30 can be stably supported at the central part of the plate 30, and thus the plate 30 is less likely to be displaced in the horizontal direction when the plate 30 is repeatedly displaced in the up and down direction. Therefore, a vibration can be stably generated.

Figure 23:
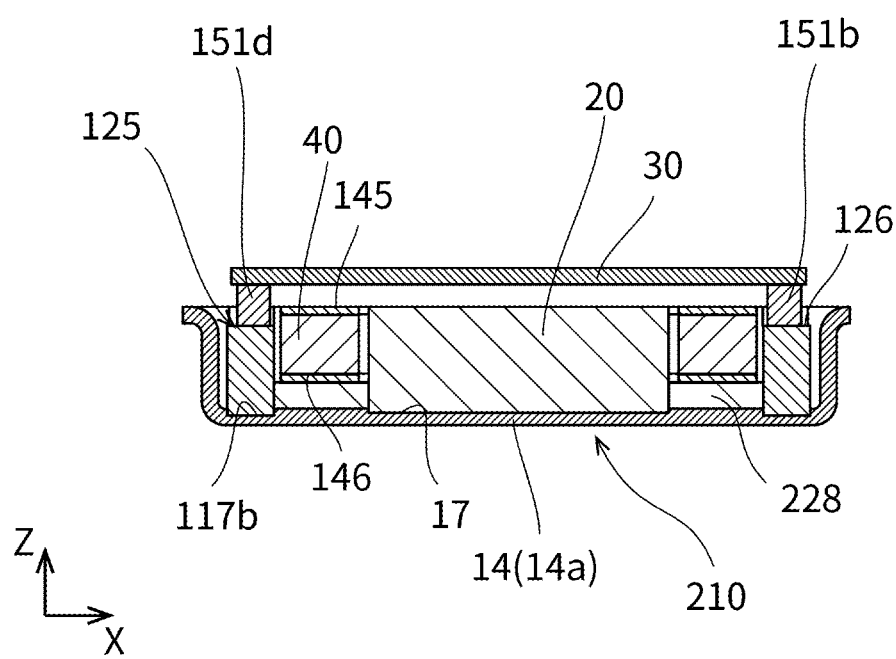
FIG. 23 is a diagram illustrating a modified example of the second embodiment.

FIG. 23 is a diagram illustrating a modified example of the second embodiment.

As illustrated in FIG. 23, the vibration generating device 201 includes a base 210, a plate 30, a coil 40, and elastic members 151b and 151d. The vibration generating device 201 and the vibration generating device 1 according to the second embodiment described above are different mainly in that the vibration generating device 201 does not include the center elastic member 151m and does not include the coil arrangement part 116. Note that FIG. 23 illustrates a sectional view of the elastic members 151b and 151d among the plurality of elastic members 151.

The base 210 includes the protruding part 20, the outer protruding part 125, and a spacer 228. The protruding part 20 is arranged in the dent 17 of the bottom part 14a of the recessed part 14. The outer protruding part 125 is arranged in the annular dent 117b formed in the bottom part 14a. The spacer 228 is arranged on the bottom part 14a between the protruding part 20 and the outer protruding part 125. The spacer 228 has a ring shape having an outer diameter being slightly smaller than the inner diameter of the outer protruding part 125, and having an inner diameter being slightly larger than the outer shape of the protruding part 20. The spacer 228 is formed with a magnetic body, like the protruding part 20 and the outer protruding part 125. For example, the spacer 228 is formed with iron. Since the spacer 228 is formed with a magnetic body, the magnetic efficiency of the magnetic circuit can be improved and the amplitude of the vibration generated by the vibration generating device 1 can be increased. The coil 40 and the insulating films 145 and 146 are arranged on the spacer 228. Note that the spacer 228 may be formed with a non-magnetic body such as resin. The insulation of the coil 40 may be reliably ensured by using a member having insulation properties as the spacer 228.

Also in the vibration generating device 201, the plate 30, the protruding part 20 of the base 210, the outer protruding part 125, and the bottom part 14a constitute a magnetic circuit. Accordingly, the vibration generating device 201 can be operated in the same manner as in the second embodiment. The vibration generating device 201 does not include the center elastic member 151m, but the other elastic members 151 are provided at vibration generating device 201. This structure enables the vibration generating device 201 to be operated. The center elastic member 151m may be provided to allow the plate 30 to be stably displaced in the up and down direction.

Third Embodiment

Figure 24:
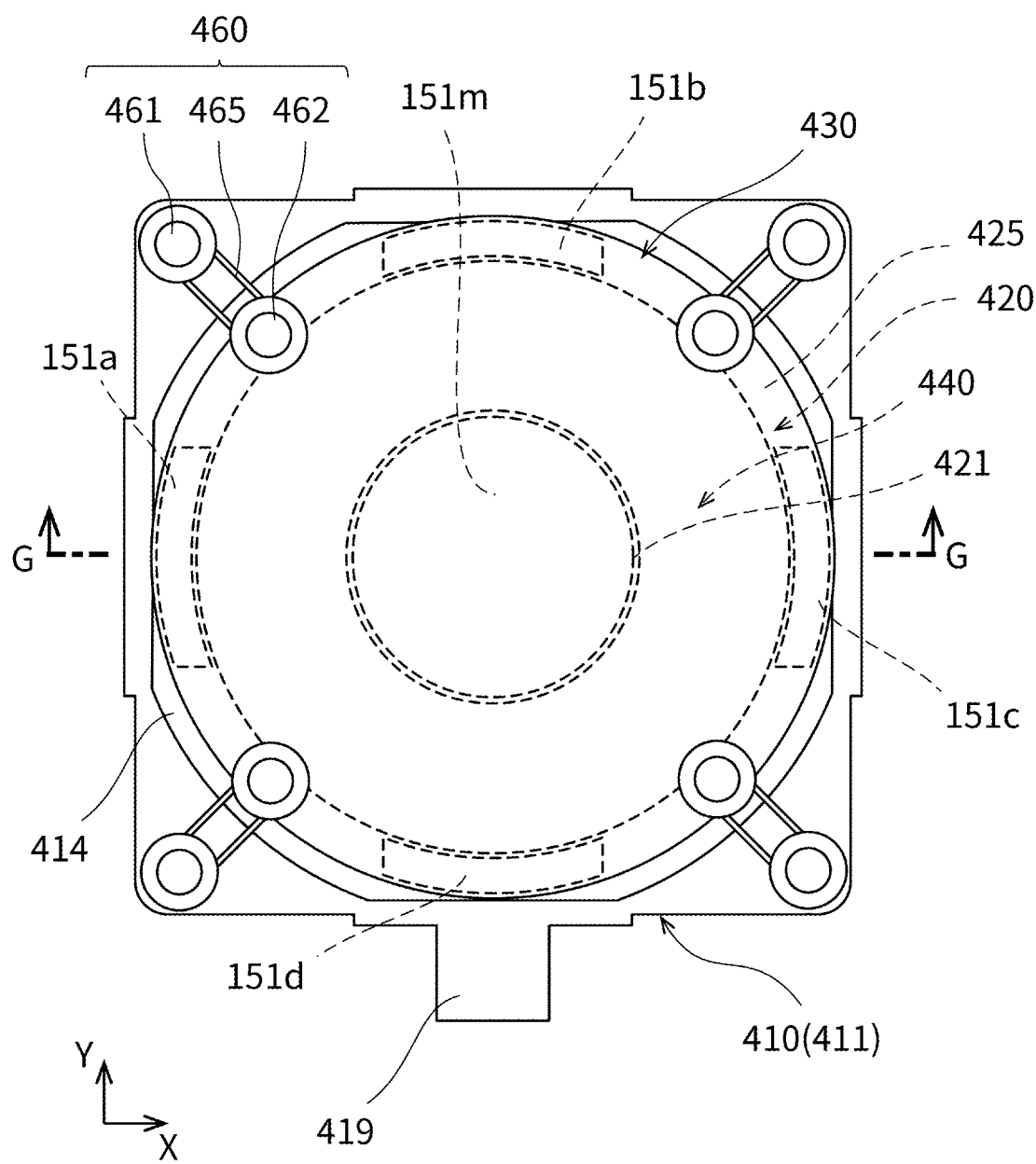
FIG. 24 is a plan view illustrating a vibration generating device according to a third embodiment.
Figure 25:
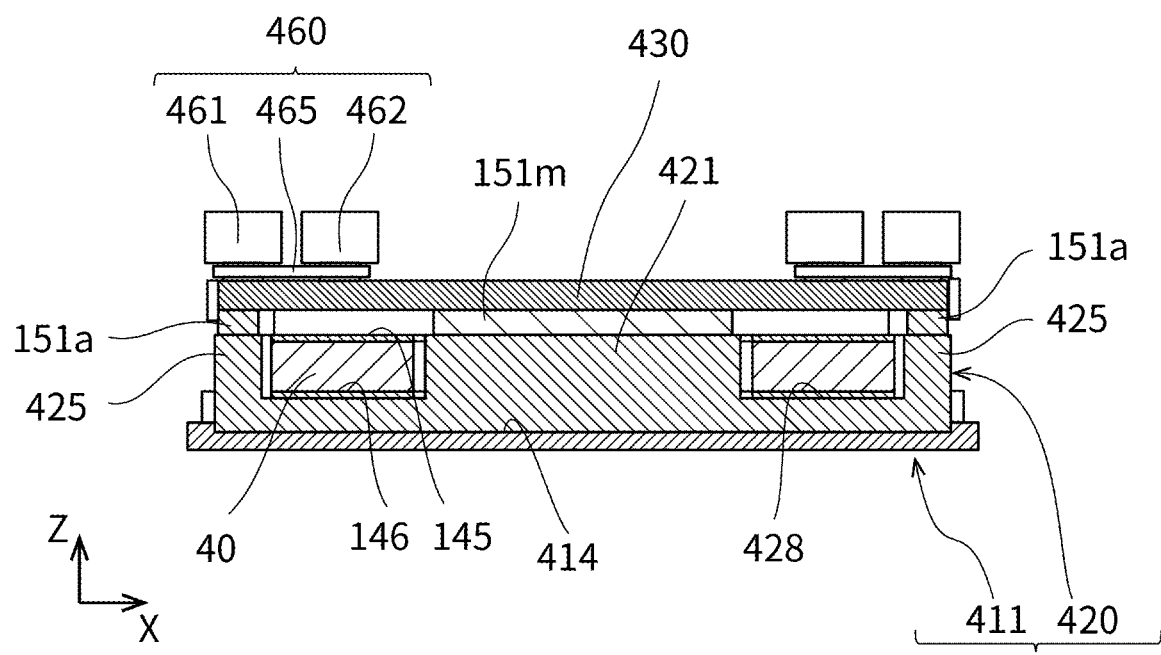
FIG. 25 is a sectional view taken along a line G-G in FIG. 24.

FIG. 24 is a plan view illustrating a vibration generating device 401 according to a third embodiment. FIG. 25 is a sectional view taken along a line G-G in FIG. 24.

As illustrated in FIGS. 24 and 25, the vibration generating device 401 includes a base 410, a plate 430, the coil 40, and the elastic members 151 (151a, 151b, 151c, 151d, and 151m). The coil 40, the insulating films 145 and 146 arranged in the up and down direction, and the elastic member 151 are similar to those of the second embodiment described above, and thus descriptions of these components are omitted.

In the third embodiment, the base 410 includes a core 420 and a bottom plate 411.

The core 420 is a magnetic body. The core 420 is formed with, for example, iron. The core 420 has, for example, a cylindrical shape as a whole. The core 420 includes a groove part 428 that is recessed downward from the upper surface. Accordingly, a center protruding part 421 and an outer protruding part 425 projecting upward as viewed from the groove part 428 are provided. In other words, the center protruding part 421 and the outer protruding part 425 are formed with one member.

The coil 40 is arranged in the groove part 428 together with the insulating films 145 and 146. The center protruding part 421 and the outer protruding part 425 function play roles in the same manner as the center protruding part 120 and the outer protruding part 125 according to the second embodiment in the vibration generating device 401. Specifically, when a current flows through the coil 40, the core 420 is excited, so that the upper part of the center protruding part 421 and the upper part of the outer protruding part 425 serve as magnetic poles.

The bottom plate 411 is, for example, a plate-like member having a roughly square shape in a plan view. A part of the bottom plate 411 where the core 420 of the bottom plate 411 corresponds to a dent 414 that is recessed from the peripheral part. The core 420 is arranged in the dent 414. In front of the bottom plate 411, a projecting part 419 is formed. A terminal (not illustrated) is arranged at the projecting part 419. For example, a through-hole or a notch part (not illustrated) penetrating between the outer surface of the core 420 and the part of the lower surface or side surface is provided in a part of the lower surface or side surface of the groove part 428 of the core 420, and the conductive wire of the coil 40 is guided to the projecting part 419 through the through-hole or notch part.

The bottom plate 411 may be formed with, for example, a magnetic body such as iron, or other types of members such as resin. The bottom plate 411 is formed with a magnetic body, which makes it possible to improve the magnetic efficiency of the magnetic circuit and increase the amplitude of the vibration generated by the vibration generating device 1. Further, the bottom plate 411 may be, for example, a circuit board or the like. The dent 414 and the projecting part 419 need not necessarily be provided at the bottom plate 411.

The elastic member 151 is arranged at the upper surface of the center protruding part 421 and at the upper surface of the outer protruding part 425. The disc-like plate 430 is arranged on the elastic member 151. Thus, the plate 430 and the core 420 including the center protruding part 421 and the outer protruding part 425 constitute a magnetic circuit. A relatively large thickness in the up and down direction of the core 420 in the part providing the groove part 428 can be ensured. Therefore, magnetic flux saturation is less likely to occur in the magnetic circuit.

A rod-like support part 461 arranged in such a manner is provided at a corner part of the bottom plate 411. In this manner, the up and down direction matches the longitudinal direction. a projecting part 462 projecting upward is provided at the upper surface of the plate 430. An annular rubber member 465 extends over the support part 461 and the projecting part 462. Thus, a holding structure 460 that holds the plate 430 with respect to the base 410 is formed. The holding structure 460 is provided at, for example, each of a front right part, a rear right part, a front left part, and a rear left part of the vibration generating device 401. With this structure, detachment of the plate 430 can be prevented and the vibration generating device 401 can be used for various applications and postures.

Also in the third embodiment, the plate 430 and the core 420 including the center protruding part 421 and the outer protruding part 425 constitute a magnetic circuit. Accordingly, the vibration generating device 401 can be operated in the same manner as in the first embodiment described above. The vibration generating device 401 according to the third embodiment can be used for various electronic devices, like in the first embodiment described above.

Fourth Embodiment

A basic structure of a vibration generating device according to a fourth embodiment is the same as that of the first embodiment, and thus a repeated description is omitted. The components of the fourth embodiment having substantially the same shape or function as that of the first embodiment are denoted by the same reference numerals, and descriptions of these components may be omitted.

Figure 26:
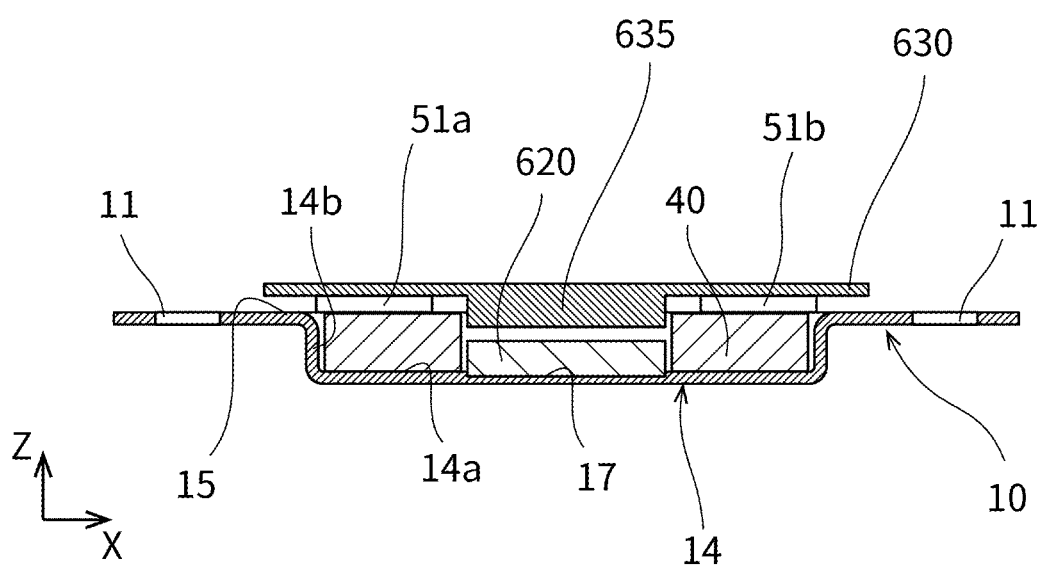
FIG. 26 is a sectional view illustrating a vibration generating device according to a fourth embodiment.

FIG. 26 is a sectional view illustrating a vibration generating device 601 according to a fourth embodiment.

As illustrated in FIG. 26, the vibration generating device 601 includes a base 10, a plate 630, a coil 40, and elastic members 51 (51a, 51b). As illustrated in FIGS. 5 and 6, the plurality of elastic members 51 is arranged in the circumferential direction on the flange part 15. A projecting part 635 is provided with a surface of the plate 630 facing the base 10. The projecting part 635 is arranged facing a protruding part 620 of the base 10. Note that the height in the up and down direction of the protruding part 620 is lowered by an amount equal to the height of a downward projection of the projecting part 635.

Also in the fourth embodiment, the projecting part 635 and the outer peripheral part of the plate 630, the protruding part 620 of the base 10, the bottom part 14a, and the flange part 15 constitute a magnetic circuit. Accordingly, the vibration generating device 601 can be operated in the same manner as in the first embodiment described above. The projecting part 635 of the plate 630 also functions as a weight. Specifically, the projecting part 635 serving as a weight, is provided at the plate 630 and the plate 630 is relatively heavy. Thereby, a larger vibration force can be generated.

Note that weight may be arranged at a surface other than the lower surface of the plate 630. A weight formed as a member different from the plate 630 may be attached to the plate 630.

The height of the upper surface of the coil 40 illustrated in FIG. 26 is the same as the height of the upper surface of the flange part 15. Thus, the magnetic attraction force can be increased by increasing the thickness of the coil 40. Note that the height of the upper surface of the coil 40 is not limited to this, but instead may be set to be the same as the height of the upper surface of the protruding part 620.

Fifth Embodiment

A basic structure of a vibration generating device according to a fifth embodiment is the same as that of the first embodiment, and thus a repeated description is omitted. The components of the fifth embodiment that have substantially the same shape or function as that of the first embodiment are denoted by the same reference numerals, and descriptions of these components may be omitted.

Figure 27:
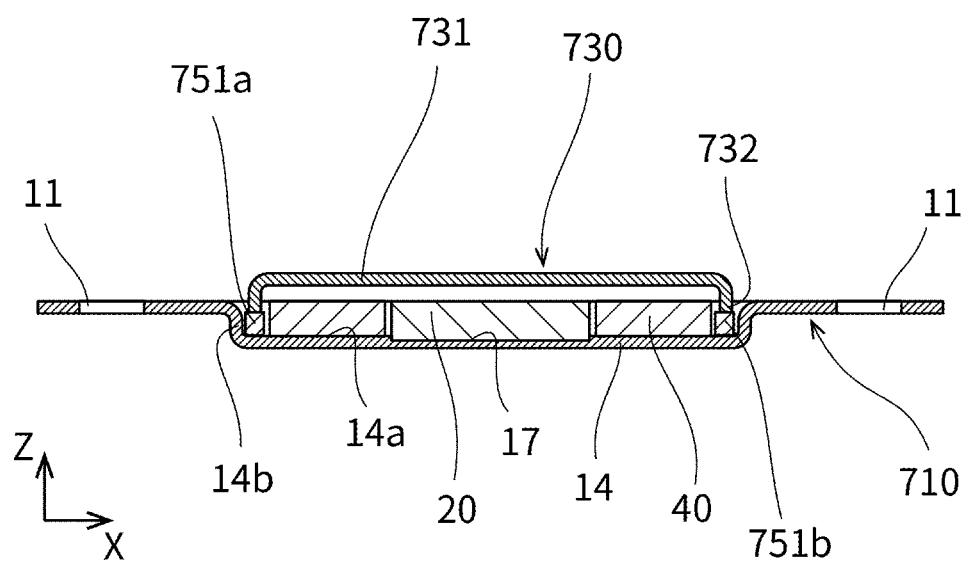
FIG. 27 is a sectional view illustrating a vibration generating device according to a fifth embodiment.

FIG. 27 is a sectional view illustrating a vibration generating device 701 according to the fifth embodiment.

As illustrated in FIG. 27, the vibration generating device 701 includes a base 710, a plate 730, the coil 40, and elastic members 751 (751a and 751b).

The plate 730 has a structure, in the structure an outer peripheral end part 732 of the plate 730 is bent. Specifically, the outer peripheral end part 732 is bent toward the coil 40 from a top surface part 731. The outer peripheral end part 732 is bent downward from the top surface part 731 as a horizontal part.

In the present embodiment, the outer peripheral end part 732 of the plate 730 is located inside the outer peripheral end part of the base 710. Specifically, the outer peripheral end part 732 is located inside the outer peripheral end part of the recessed part 14 of the base 710, i.e., inside the side wall part 14b. The plate 730 is attached to the base 710 in such a manner. In the manner, the outer peripheral end part 732 is located inside the recessed part 14 of the base 710. The outer peripheral end part 732 is located between the outer peripheral side surface of the coil 40 and the side wall part 14b of the base 710. The elastic members 751 are arranged between a lower end of the outer peripheral end part 732 and an upper surface of the bottom part 14a of the recessed part 14 of the base 710. The elastic member 751 supports the plate 730 with respect to the base 710, like the elastic members 51 according to the first embodiment.

In the fifth embodiment, the plate 730 and the base 710 constitute a magnetic circuit. Accordingly, the vibration generating device 701 can be operated in the same manner as in the first embodiment. Since the outer peripheral end part 732 of the plate 730 is located close to the bottom part 14a and the side wall part 14b of the base 710, so that a magnetic flux is less likely to leak (a magnetic resistance decreases) between the plate 730 and the base 710. Therefore, the efficiency of the vibration generating device 701 can be improved.

Sixth Embodiment

Figure 28:
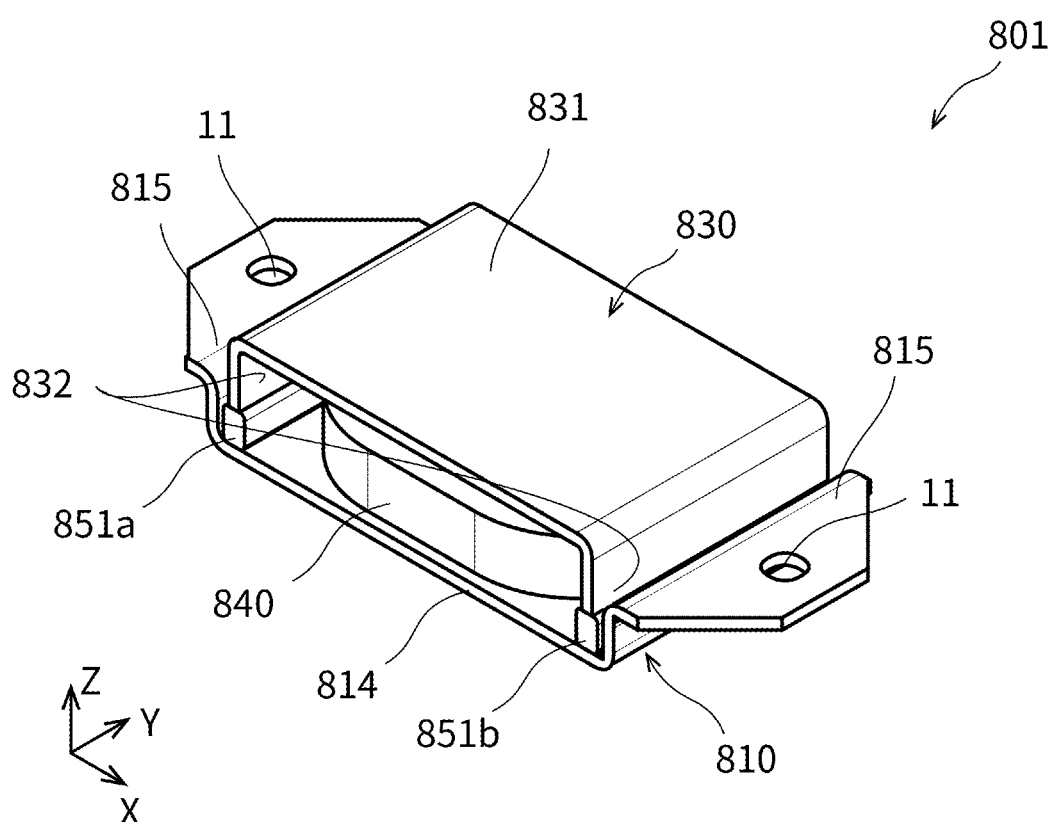
FIG. 28 is a perspective view illustrating a vibration generating device according to a sixth embodiment.
Figure 29:
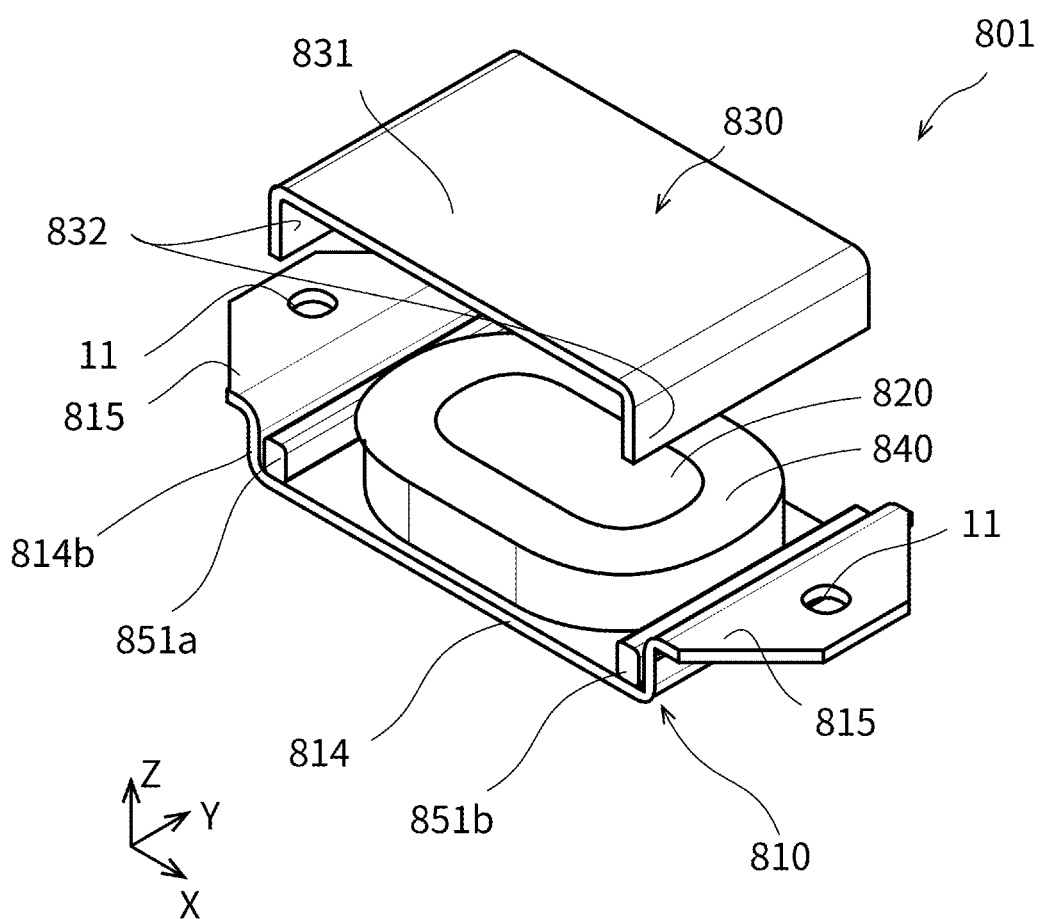
FIG. 29 is a view illustrating the structure of the vibration generating device according to the sixth embodiment.

FIG. 28 is a perspective view illustrating a vibration generating device 801 according to a sixth embodiment. FIG. 29 is a view illustrating the structure of the vibration generating device 801 according to the sixth embodiment.

Referring to FIGS. 28 and 29, the vibration generating device 801 has a rectangular parallelepiped shape as a whole. The vibration generating device 801 includes a base 810, a plate 830, a coil 840, and elastic members 851 (851a and 851b).

The base 810 includes a flange part 815. The hole parts 11 is formed at the right and left side parts of the flange part 815. The base 810 includes a recessed part 814 recessed downward at the central part between the both flange parts 815. The recessed part 814 has a rectangular shape whose side in the left and right direction is longer than a side in the front and back direction. A core 820 is arranged in the recessed part 814. The coil 840 is arranged around the core 820. The core 820 and the coil 840 are each formed in, for example, an oval shape, being long in the left and right direction, (including a shape obtained by connecting two semicircular arcs with two lines) in accordance with the shape of the recessed part 814.

The plate 830 includes a top surface part 831 as a horizontal part, and two bent parts 832 located at a right end and a left end, respectively, and being bent in the direction of the coil 840 from the top surface part 831. The bent parts 832 are located inside the outer peripheral end part of the base 810. Specifically, the bent parts 832 are located inside the side wall part 814a of the recessed part 814 of the base 810. The plate 830 is attached to the base 810 in such a manner that a lower end of each of the bent parts 832 is located inside the recessed part 814 of the base 810. The lower end of each of the bent parts 832 is located between the outer peripheral side surface of the coil 840 and a side wall part 814b of the base 810. The elastic members 851 are arranged between the lower end of each of the bent parts 832 and the upper surface of the recessed part 814 of the base 810. The elastic members 851 support the plate 830 with respect to the base 810, like the elastic members 51 according to the first embodiment.

In the sixth embodiment, the plate 830 and the base 810 constitute a magnetic circuit. Accordingly, the vibration generating device 801 can be operated in the same manner as in the first embodiment. The bent parts 832 of the plate 830 are located close to the upper surface of the recessed part 814 of the base 810 and face the side wall part 814b, so that a magnetic flux is less likely to leak (a magnetic resistance decreases) between the plate 830 and the base 810. Therefore, the efficiency of the vibration generating device 801 can be improved.

The members such as the base 810 and the plate 830 of the vibration generating device 801 can be easily produced by linear bending or the like.

Figure 30:
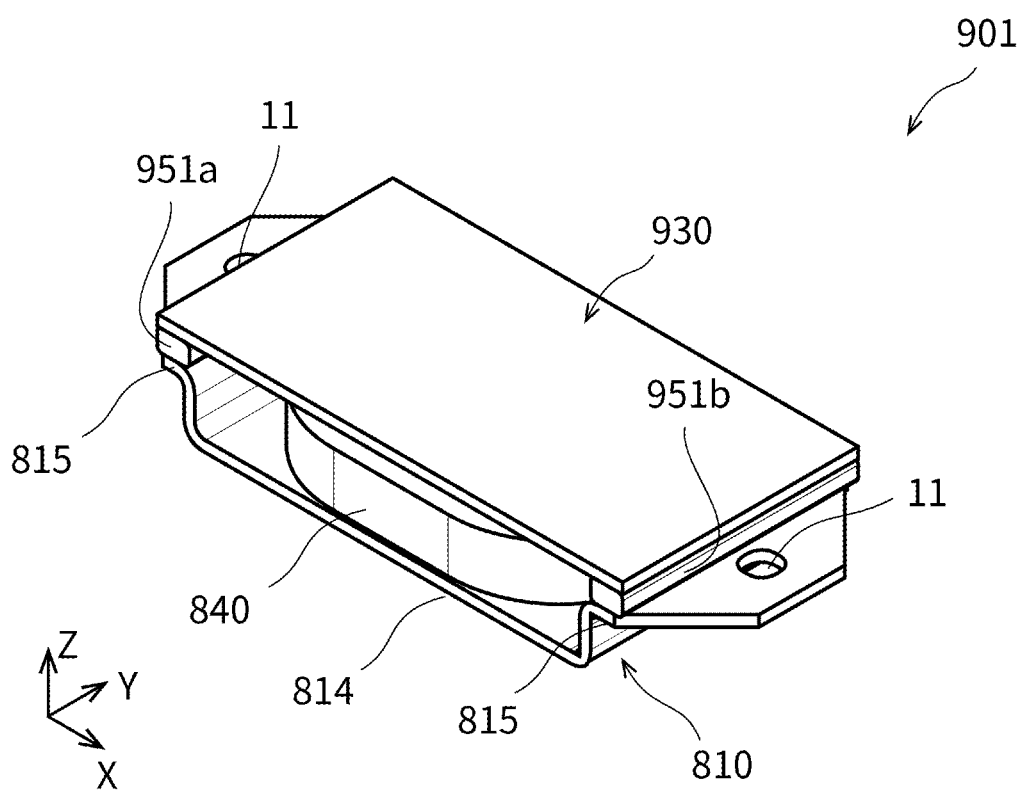
FIG. 30 is a perspective view illustrating a vibration generating device according to a modified example of the sixth embodiment.
Figure 31:
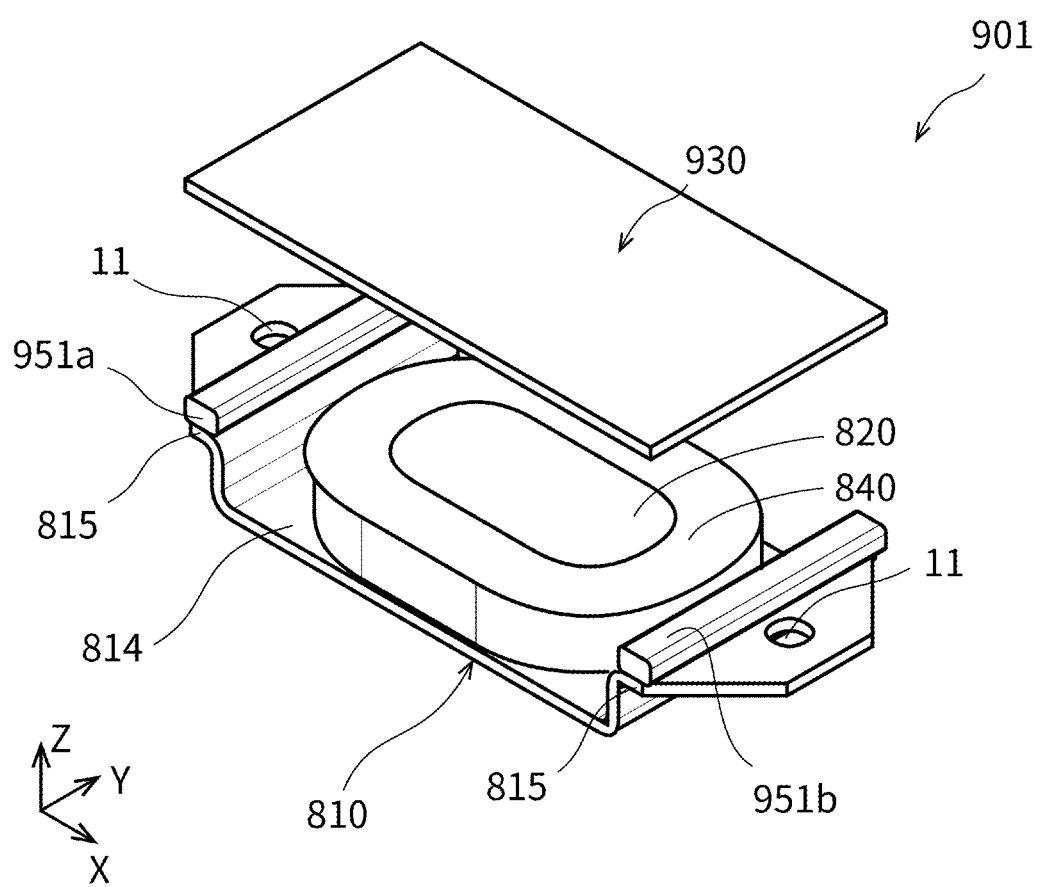
FIG. 31 is a view illustrating the structure of the vibration generating device according to the modified example of the sixth embodiment.

FIG. 30 is a perspective view illustrating a vibration generating device 901 according to a modified example of the sixth embodiment. FIG. 31 is a view illustrating the structure of the vibration generating device 901 according to the modified example of the sixth embodiment.

Referring to FIGS. 30 and 31, the vibration generating device 901 has basically the same structure as that of the vibration generating device 801 according to the sixth embodiment. In the vibration generating device 901, a plate 930 having a flat plate shape is used instead of the plate 830. Instead of the elastic members 851, elastic members 951 (951a and 951b) are arranged at the upper surface of the flange part 815 of the base 810. A right side part and a left side part of the plate 930 face the flange part 815. The elastic members 951 are arranged so as to be sandwiched between the flange part 815 and each of the right side part and the left side part of the plate 930.

In the vibration generating device 901, the flange part 815 of the base 810 serves as a magnetic pole part. The plate 930 and the base 810 constitute a magnetic circuit. Accordingly, the vibration generating device 901 can be operated in the same manner as the vibration generating device 801. Since the right and left side parts of the plate 930 face the flange part 815, a magnetic flux is less likely to leak (a magnetic resistance decreases) between the plate 930 and the base 810. Therefore, the efficiency of the vibration generating device 901 can be improved.

Other

The vibration generating device may be formed by appropriately combining the individual features of the embodiments described above or modified examples of the embodiments. For example, the outer shape of the vibration generating device 1 illustrated in FIG. 18 may have a disc shape as illustrated in FIG. 4, or may have a rectangular parallelepiped shape as illustrated in FIG. 28 described below. Further, the vibration generating device 1 illustrated in FIG. 18 may be appropriately changed to any one of the vibration generating devices 101, 201, 401, 601, 701, 801, and 901 according to the second to sixth embodiments.

Examples of other members include publicly-known members such as an adhesive, the above-mentioned elastic members, and resin members.

The type of the vibration generating device is not limited to a thin vibration generating device, or a small vibration generating device illustrated above. A large vibration generating device having basically the same structure as that described above may be provided.

The vibration generating device can be used not only for the electronic devices of the above-mentioned types, but also for various types of electronic devices. For example, the vibration generating device can be used for various electronic devices, such as a personal computer, peripheral devices for the personal computer, domestic electronic equipment such as a television, a refrigerator, and a washing machine, electronic devices such as remote controllers for operating them, electronic devices used for devices for transportation, and electronic devices used for buildings and the like.

It should be considered that the embodiments described above are illustrative in every respect and are not limitative. The scope of the present disclosure is not defined by the above description but by the claims. It is intended that the meanings equivalent to the claims and all the changes within the claims are included in the present disclosure.

What is claimed is:

1. An electronic device, comprising:
   a housing;
   a touch panel attached to the housing;
   a base attached to the housing;
   a plate displaceable with respect to the base;
   a plurality of elastic members supporting the plate with respect to the base; and
   a coil inside the plurality of elastic members;
   wherein
   the touch panel, the base, the plate, and the elastic members are arranged inside the housing,
   the coil is arranged in the plate side with respect to the base,
   a magnetic gap is formed with the plate and the base, and
   the plate connects with the touch panel in a winding axis direction of the coil.

2. The electronic device according to claim 1, wherein a magnetic circuit is formed with the coil, the base, and the plate.

3. The electronic device according to claim 1, wherein the plate and the base are spaced apart from each other by an amount equal to the thickness of the elastic member.

4. The electronic device according to claim 1, wherein the electronic device is driven by repeatedly switching a state such that a current flows through the coil and a state of no current flowing through the coil.

5. The electronic device according to claim 1, wherein the plate is displaced in a direction away from or closer to the base.

6. The electronic device according to claim 1, wherein the plate is displaced in a direction that the plate vibrates with respect to the base.

7. The electronic device according to claim 1, wherein the plurality of elastic members are resin members.

8. The electronic device according to claim 1, comprising: a force sensor.

9. An electronic device, comprising:
a housing;
a touch panel attached to the housing;
a base;
a plate;
a plurality of elastic members connecting the plate and the base; and
a coil inside the plurality of elastic members;
wherein
the touch panel, the base, the plate, and the elastic members are arranged inside the housing,
the coil is arranged in the plate side with respect to the base,
a magnetic gap is arranged between the plate and the base,
the base connects with the touch panel in a winding axis direction of the coil.

10. The electronic device according to claim 9, wherein a magnetic circuit is formed with the coil, the base, and the plate.

11. The electronic device according to claim 9, wherein the plate and the base are spaced apart from each other by an amount equal to the thickness of the elastic member.

12. The electronic device according to claim 9, wherein the electronic device is driven by repeatedly switching a state such that a current flows through the coil and a state of no current flowing through the coil.

13. The electronic device according to claim 9, wherein the plate is displaced in a direction away from or closer to the base.

14. The electronic device according to claim 9, wherein the plate is displaced in a direction that the plate vibrates with respect to the base.

15. The electronic device according to claim 9, wherein the plurality of elastic members are resin members.

16. The electronic device according to claim 9, comprising:
a force sensor.

* * * * *